(12) United States Patent
Kim

(10) Patent No.: US 8,482,708 B2
(45) Date of Patent: *Jul. 9, 2013

(54) MULTI-DOMAIN LIQUID CRYSTAL DISPLAY AND MANUFACTURING METHOD OF THE SAME

(75) Inventor: Jae-Hoon Kim, Yongin-si (KR)

(73) Assignee: IUCF-Hyu (Industry-University Cooperation Foundation Hanyang University), Seoul (KR)

( * ) Notice: Subject to any disclaimer, the term of this patent is extended or adjusted under 35 U.S.C. 154(b) by 417 days.

This patent is subject to a terminal disclaimer.

(21) Appl. No.: 12/722,615

(22) Filed: Mar. 12, 2010

(65) Prior Publication Data

US 2011/0128487 A1 Jun. 2, 2011

(30) Foreign Application Priority Data

Nov. 30, 2009 (KR) .................. 10-2009-0116639
Mar. 5, 2010 (KR) .................. 10-2010-0019886

(51) Int. Cl.
*G02F 1/1337* (2006.01)

(52) U.S. Cl.
USPC ............... 349/129; 349/123; 349/125

(58) Field of Classification Search
USPC .................... 349/117, 129, 123, 125
See application file for complete search history.

(56) References Cited

U.S. PATENT DOCUMENTS

| 2007/0024782 A1* | 2/2007 | Kwok et al. | 349/123 |
| 2008/0123037 A1* | 5/2008 | Mizuki et al. | 349/125 |
| 2010/0085520 A1* | 4/2010 | Katayama | 349/114 |

FOREIGN PATENT DOCUMENTS

| KR | 10-1999-0009290 | 2/1999 |
| KR | 10-2002-0080862 | 10/2002 |
| KR | 10-2006-0032705 | 4/2006 |
| KR | 10-0861014 | 9/2008 |

OTHER PUBLICATIONS

Korean Patent and Trademark Office, International Search Report of PCT/KR2010/007194, Jun. 23, 2011, Korea.

You-Jin Lee et al., Fabrication of Fast Switchable Patterned Vertical-Alignment Mode Using Modified Surface with Reactive Mesogen, 2009 International Symposium, Seminar, and Exhibition, May 31-Jun. 5, 2009, TX, USA.

You-Jin Lee et al., Surface-controlled patterned vertical alignment mode with reactive mesogen, Optics Express, vol. 17, No. 12, 4 Jun. 2009, p. 10298-10303.

* cited by examiner

*Primary Examiner* — Phu Vu

(74) *Attorney, Agent, or Firm* — Lexyoume IP Meister, PLLC.

(57) ABSTRACT

According to an exemplary embodiment of the present invention, a liquid crystal layer may be aligned by using an alignment layer including an alignment base layer having a horizontal alignment base layer and a vertical alignment base layer, and an alignment control agent. Accordingly, a multi-domain liquid crystal display having an excellent viewing angle for all grays may be provided. Also, a multi-domain liquid crystal display having a fast response speed as well as an excellent viewing angle for all grays may be provided.

38 Claims, 26 Drawing Sheets

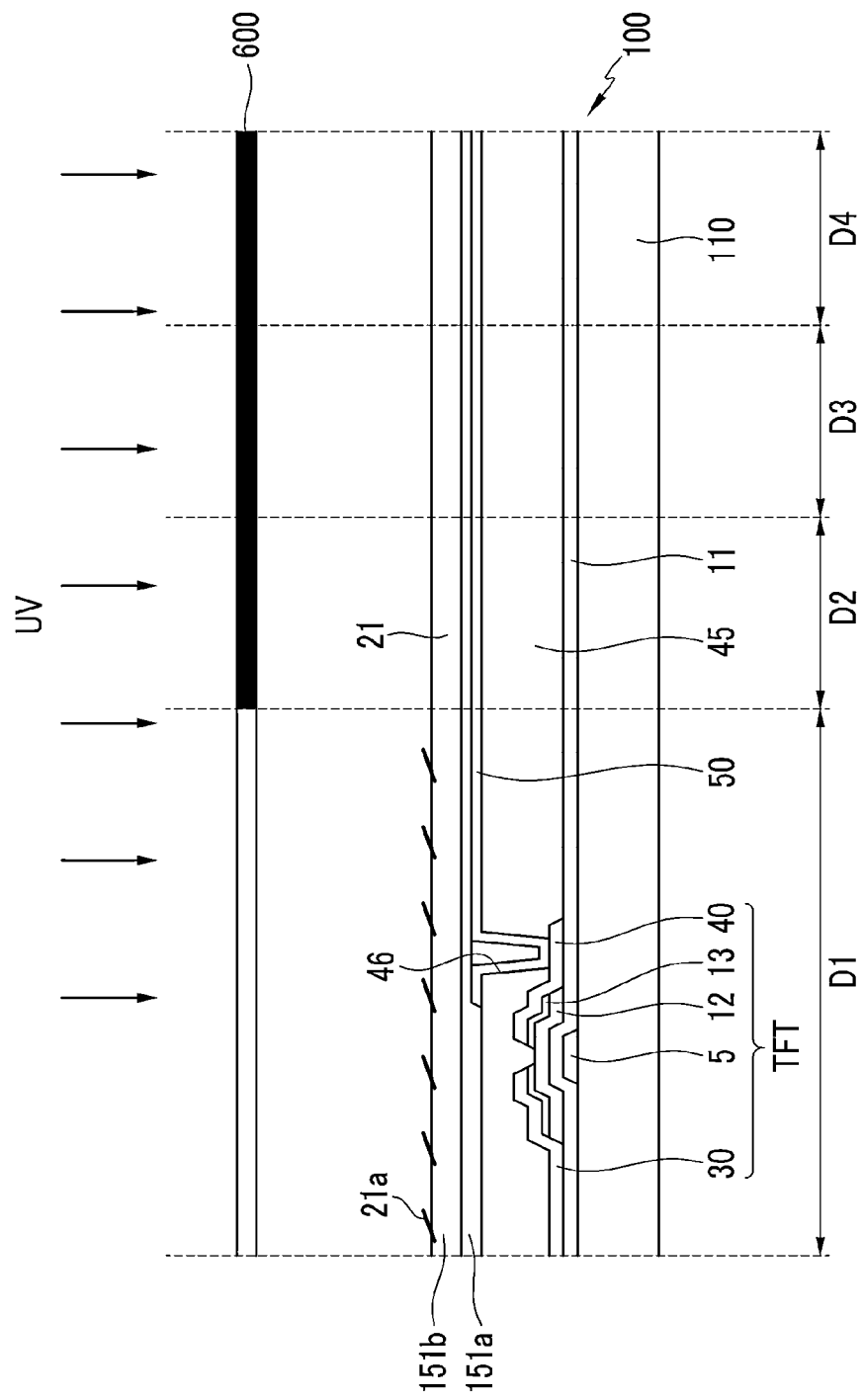

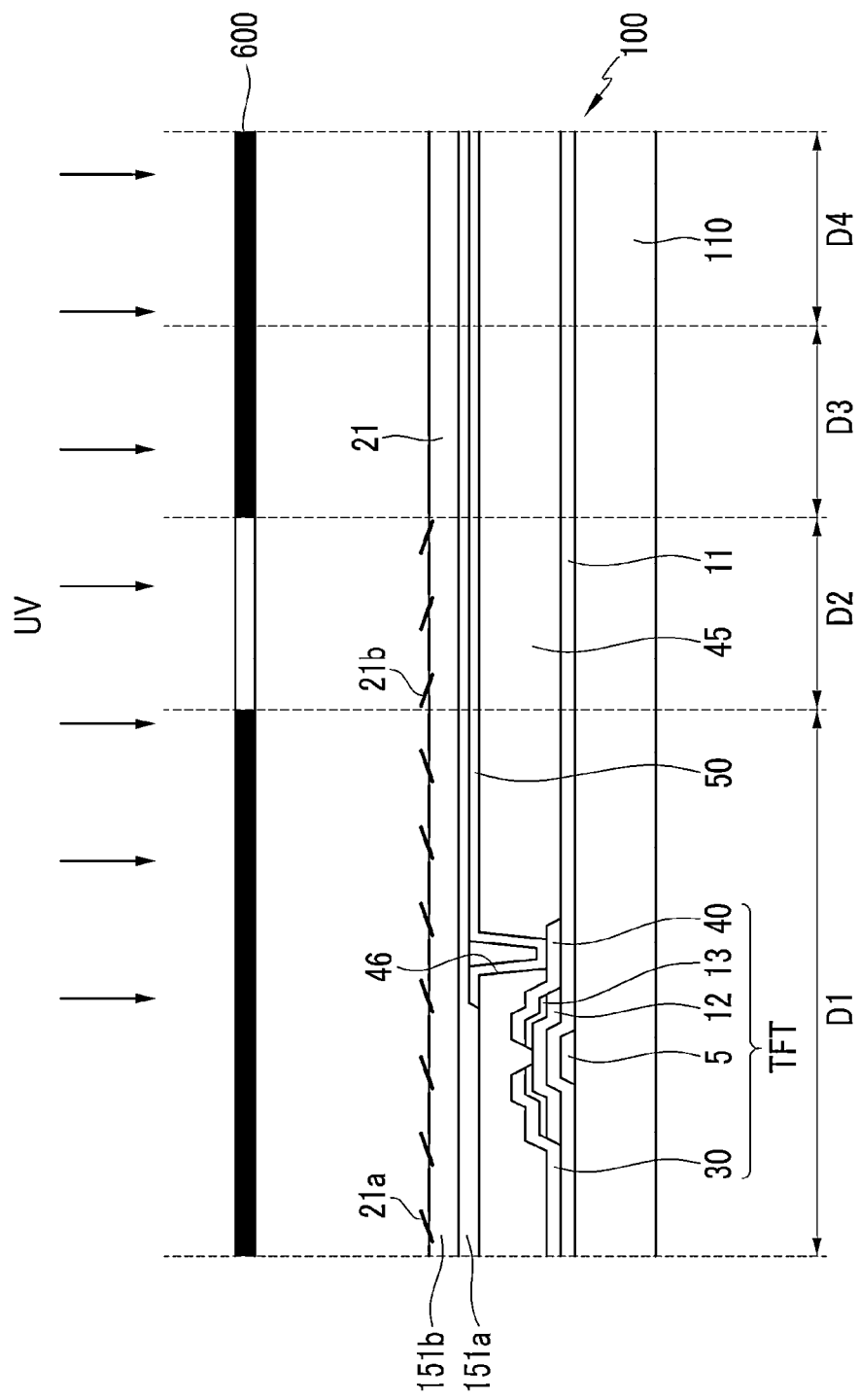

MULTI-DOMAIN LIQUID CRYSTAL DISPLAY AND MANUFACTURING METHOD OF THE SAME

CROSS-REFERENCE TO RELATED APPLICATION

This application claims priority to and the benefit of Korean Patent Application Nos. 10-2009-0116639 and 1-2010-0019886 filed in the Korean Intellectual Property Office on Nov. 30, 2009 and Mar. 5, 2010, the entire contents of which are incorporated herein by reference.

BACKGROUND OF THE INVENTION (a) Field of the Invention

The present invention relates to a multi-domain liquid crystal display and a manufacturing method thereof.

(b) Description of the Related Art

Among liquid crystal displays, a twisted nematic (TN) mode has high light transmittance efficiency compared with different modes, and the manufacturing process thereof is simple such that it is widely used. However, the viewing angle may be deteriorated at the special direction.

In the liquid crystal display of the twisted nematic mode, to improve the viewing angle, a method using a phase difference film and a method applying multi-alignment using a horizontal alignment layer are used. However, when using the phase difference film, an additional process is required and the product cost is increased. Also, in the method applying the multi-alignment, the pre-tilt polar angle is not high enough under the alignment using the horizontal alignment such that there is a problem that the multi-domain is not formed in the low grays, in the multi-domain and response speed is slow.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a multi-domain liquid crystal display providing an excellent viewing angle and a fast response speed for all grays.

A liquid crystal display according to an exemplary embodiment of the present invention includes: a first substrate; a first horizontal alignment base layer disposed on the first substrate; a first vertical alignment base layer disposed on the first horizontal alignment layer; a first alignment layer including a first alignment control agent extended from the first vertical alignment base layer; a second substrate facing the first substrate; a second horizontal alignment base layer disposed on the second substrate; a second vertical alignment base layer disposed on the second horizontal alignment base layer; a second alignment layer including a second alignment control agent extended from the second vertical alignment base layer; and a liquid crystal layer interposed between the first substrate and the second substrate, wherein the first and second alignment layers are light-aligned.

The first alignment control agent and the second alignment control agent may be formed by polymerizing a photo-polymerizable monomer or oligomer.

The photo-polymerizable monomer or oligomer may include a reactive mesogen.

The liquid crystal layer may be a twisted nematic liquid crystal layer.

The first alignment layer may include a first region and a second region that are light-aligned in opposite directions, and The second alignment layer may include a third region and a fourth region that are light-aligned in opposite directions, and the light-alignment direction of the first region and the second region may be perpendicular to the light-alignment direction of the third region and the fourth region.

A liquid crystal display according to another exemplary embodiment of the present invention includes: a first substrate; a first alignment base layer disposed on the first substrate and formed by mixing a horizontal alignment material and a vertical alignment material; a first alignment layer disposed on the first alignment base layer and including a first alignment control agent extended from the alignment base layer; a second substrate facing the first substrate; a second alignment base layer disposed on the second substrate and including a horizontal alignment material and a vertical alignment material; a second alignment layer disposed on the second alignment base layer and including a second alignment control agent extended from the second alignment base layer; and a liquid crystal layer interposed between the first substrate and the second substrate, wherein the first and second alignment layers are light-aligned.

A manufacturing method of a liquid crystal display according to an exemplary embodiment of the present invention includes: depositing a first alignment material layer including a horizontal alignment material, a vertical alignment material, and an alignment control material on a first substrate; primarily exposing the first alignment material layer to form a first alignment base layer that is light-aligned to have a plurality of domains; secondarily exposing the first alignment material layer to form a first alignment control agent by polymerizing the alignment control material; depositing a second alignment material layer including a horizontal alignment material, a vertical alignment material, and an alignment control material on a second substrate; primarily exposing the second alignment material layer to form a second alignment base layer that is light-aligned to have a plurality of domains; secondarily exposing the second alignment material layer to form a second alignment control agent by polymerizing the alignment control material, wherein the first alignment control agent includes a plurality of branches extended from the first alignment base layer and the second alignment control agent includes a plurality of branches extended from the second alignment base layer.

The method may further include assembling the first substrate including the first alignment base layer and the first alignment control agent and the second substrate including the second alignment base layer and the second alignment control agent to face each other, and injecting a liquid crystal layer between the first substrate and the second substrate.

A manufacturing method of a liquid crystal display according to another exemplary embodiment of the present invention includes: depositing a first alignment material layer including a horizontal alignment material, a vertical alignment material, and an alignment control material on a first substrate; primarily exposing the first alignment material layer to form a first alignment base layer that is light-aligned to have a plurality of domains; depositing a second alignment material layer including a horizontal alignment material, a vertical alignment material, and an alignment control material on a second substrate; primarily exposing the second alignment material layer to form a second alignment base layer that is light-aligned to have a plurality of domains; assembling the first substrate and the second substrate to face each other; and secondarily exposing the first alignment material layer and the second alignment material layer in a state in which the liquid crystal layer is applied with an electric field to form a first alignment control agent disposed on the first alignment base layer and a second alignment control agent disposed on the second alignment base layer, wherein the first alignment control agent includes a plurality of branches extended from the first alignment base layer, and the second alignment control agent includes a plurality of branches extended from the second alignment base layer.

The method may further include injecting a liquid crystal layer between the first substrate and the second substrate after assembling the first substrate and the second substrate to face each other.

The method may further include injecting a liquid crystal layer between the first substrate and the second substrate after forming the alignment control agent and the second alignment control agent.

According to an exemplary embodiment of the present invention, a liquid crystal layer may be aligned by using an alignment layer including an alignment base layer having a horizontal alignment base layer and a vertical alignment base layer, and an alignment control agent. Accordingly, a multi-domain liquid crystal display having a fast response speed as well as an excellent viewing angle over all grays may be provided.

DETAILED DESCRIPTION OF THE EMBODIMENTS

The advantages, features, and aspects of the invention will become apparent from the following description of the embodiments with reference to the accompanying drawings, which is set forth hereinafter. However, the present invention is not limited to exemplary embodiments that are described herein. The present invention may have various embodiments. The exemplary embodiments are provided to clearly show the present invention to those skilled in the art, and the present invention is intended to cover various modifications and equivalent arrangements included within the spirit and scope of the appended claims. Accordingly, in various exemplary embodiments, well-known processes, well-known elements, and well-known techniques are not explained in detail to avoid ambiguous interpretation of the present invention.

Now, an exemplary embodiment of the present invention will be described with reference to accompanying drawings.

Figure 1A:
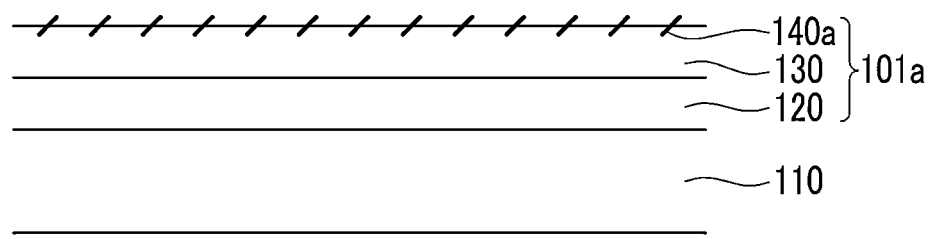
FIG. 1A is a cross-sectional view of a display panel for a liquid crystal display according to an exemplary embodiment of the present invention.

Firstly, a display panel for a liquid crystal display according to an exemplary embodiment of the present invention will be described with reference to FIG. 1A. FIG. 1A is a cross-sectional view of a display panel for a liquid crystal display according to an exemplary embodiment of the present invention.

Referring to FIG. 1A, a display panel for a liquid crystal display an exemplary embodiment of the present invention includes an insulating substrate 110 and a first alignment layer 101a disposed on the insulating substrate 110. The first alignment layer 101a includes an alignment layer including a first alignment base layer 120 disposed on the insulating substrate 110, a second alignment base layer 130 disposed on the first alignment base layer 120, and a first alignment control agent 140a disposed on the second alignment base layer 130. The first alignment control agent 140a includes a plurality of branches extending from the second alignment base layer 130.

Although not shown, signal lines such as a gate line and a data line, a switching element connected to the signal lines such as a thin film transistor (TFT), and a pixel electrode connected to the switching element may be formed between the insulating substrate 110 and the first alignment layer 101a. Also, a color filter, a light blocking member, and a common electrode may be formed between the insulating substrate 110 and the first alignment layer 101a.

The first alignment base layer 120 includes a horizontal alignment material, and the second alignment base layer 130 includes a vertical alignment material. The first alignment base layer 120 and the second alignment base layer 130 may be light-aligned. The first alignment base layer 120 and the second alignment base layer 130 may include at least one of polymer-based materials, for example a polyamic acid, a polyimide, nylon, polyvinylalcohol (PVA), and polyvinyl alcohol (PVC).

The first alignment base layer 120 and the second alignment base layer 130 include a light alignment material, and may be light-aligned. In detail, the light-alignment material may be divided into a photolysis material, a photo-isomer material, a photo-hardening material, and a photo-polymerization material according to kind of reaction to the light. In the case of the photolysis material, decomposition of the polymer chain is anisotropically generated by the polarized UV such that the light-alignment may be realized through the structural anisotropy generated by the polarized UV. For example, if a polyimide is irradiated by the polarized UV, the chain is disconnected and an oxidation reaction occurs. The above-described materials may have high thermal stability. The photo-isomerizing material is changed into a cis/trans isomer by the light such that the light-alignment is realized in the generated direction. The photo-hardening material is light-aligned by having anisotropy through a selective reaction of a light reaction group in the polarized direction by the polarized UV.

The photo-polymerizing material is photo-polymerized under the light irradiation thereby forming a polymer having the pre-tilt.

The light-alignment material may includes a high molecular material selected from the group including a polyimide, a polyamic acid, polynorbornene, a phenyl maleimide copolymer, polyvinylcinnamate, polyazobenzene, polyethyleneimine, polyvinyl alcohol, a polyamide, polyethylene, polystyrene, polyphenylenephthalamide, polyester, polyurethane, polysiloxanecinnamate, a cellulosecinnamate compound, and a polymethyl methacrylate compound.

The first alignment control agent 140a is formed by photopolymerizing the photo-polymerizable monomer or oligomer. As the photopolymerizable monomer or oligomer, there are a reactive mesogen (RM), NOA series manufactured by Norland, Co., Ltd., and the like. The term "reactive mesogen" (RM) means a polymerizable mesogenic compound. The term "mesogenic material" or "mesogenic compound" includes materials or compounds including one or more rod-shaped, board-shaped, or disk-shaped mesogenic groups, i.e., groups with the ability to induce liquid crystal phase behavior. Liquid crystal compounds with rod-shaped or board-shaped groups are also known in the art as "calamitic" liquid crystals. Liquid crystal compounds with a disk-shaped group are also known in the art as "discotic" liquid crystals. The compounds or materials including mesogenic groups do not necessarily have to exhibit a liquid crystal phase themselves. It is also possible that they show liquid crystal phase behavior only in mixtures with other compounds, or when the mesogenic compounds or materials, or the mixtures thereof, are polymerized.

The reactive mesogen is polymerized by light such as ultraviolet rays, and is a material that is aligned according to an alignment state of the adjacent material. Examples of the reactive mesogen may be a compound that is represented by the following formula.

P1-A1-(Z1-A2)n-P2,

Herein, P1 and P2 are independently selected from acrylate, methacrylate, vinyl, vinyloxy, and epoxy groups, A1 and A2 are independently selected from 1,4-phenylene and naphthalene-2,6-diyl groups, Z1 is any one of COO—, OCO—, and single bonds, and n is any one of 0, 1, and 2.

In more detail, it may be a compound that is represented by any one of the following formulas.

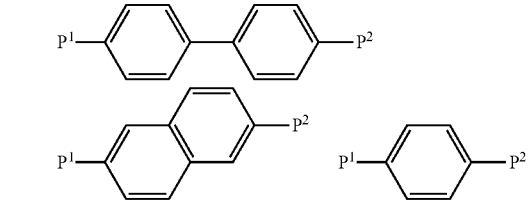

Herein, P1 and P2 are independently selected from acrylate, methacrylate, vinyl, vinyloxy, and epoxy groups.

All alignment layers according to an exemplary embodiment of the present invention are light-aligned for the liquid crystal molecules disposed thereon to have a predetermined pre-tilt, and in the specification, the pre-tilt may have an angle and a direction that are hereafter respectively defined as a polar angle of 0-180 degrees and a azimuthal angle of 0-360 degrees. That is, the pre-tilt may be interpreted as a mean including both the azimuthal angle of 0-360 degrees and the polar angle of 0-180 degrees. Here, the azimuthal angle means an angle at which the projection on the substrate of the alignment layer or the liquid crystal is inclined with reference to the signal lines of the liquid crystal display, for example the gate lines or the data lines. The polar angle means an angle at which the alignment control agent or the liquid crystal is inclined with reference to a line that is perpendicular to the horizontal surface of the substrate (a normal line of the substrate surface).

The second alignment base layer 130 is coated by mixing a vertical alignment material with a solution in which a solvent, NMP (n-methyl-pyrrolidone), BL (butyrolactone) and BC (butoxyethanol) are mixed in a ratio of about 3:4:3. The thickness of the second alignment base layer 130 may be changed according to the amount (weight percent: wt %) of the vertical alignment layer material.

Generally, the polar angle $\theta_{min}$ of the minimum pre-tilt required to form four stable domains is obtained by the following equation.

$$\theta_{min}^2 = \pi d/L$$

Here, d is a cell interval of a liquid crystal layer, and L is a horizontal size of the domain.

For example, when the cell interval is 5 μm and the horizontal size of the domain is 100 μm, the polar angle $\theta_{min}$ of the minimum pre-tilt required to form four stable domains is about 22°.

Generally, the horizontal alignment layer has a polar angle of about 4-5°, and the vertical alignment layer has a polar angle of about 89-90° such that it is difficult to form the four stable domains in the twisted nematic mode.

In the case of the display panel for a liquid crystal display according to an exemplary embodiment of the present invention, the alignment layer 101a includes the first alignment base layer 120 including the horizontal alignment material and the second alignment base layer 130 including the vertical alignment material, thereby realizing a polar angle having a middle value between the polar angles of the horizontal alignment layer and the vertical alignment layer by the combination of the anchoring energy of the first alignment base layer 120 and the second alignment base layer 130. For example, the thickness of the second alignment base layer 130 is increased compared with the first alignment base layer 120, the polar angle of the pre-tilt is increased; otherwise, the polar angle of the pre-tilt may be decreased.

Accordingly, in the case of the display panel for a liquid crystal display according to an exemplary embodiment of the present invention, the alignment layer 101a includes the first alignment base layer 120 including the horizontal alignment material and the second alignment base layer 130 including the vertical alignment material such that the liquid crystal molecules may be aligned to have the desired polar angle.

Also, the alignment layer 101a includes the first alignment control agent 140a protruding from the second alignment base layer 130 and having the pre-tilt. The pre-tilt angle and the direction of the liquid crystal directors may be changed by the pre-tilt of the first alignment control agent 140a, and also the response speed of the liquid crystal molecules may be increased.

Figure 1B:
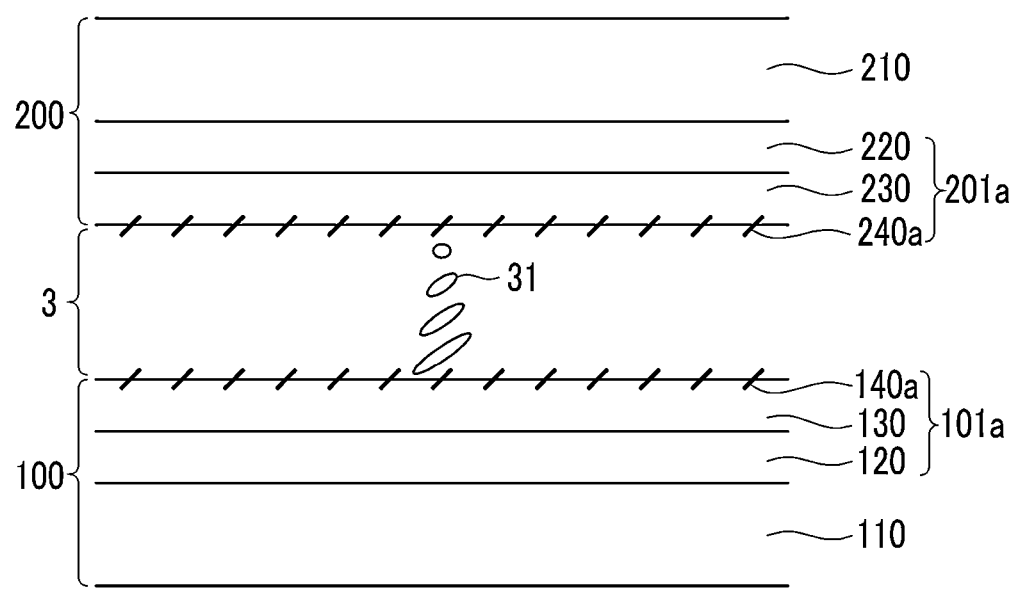
FIG. 1B is a cross-sectional view of a liquid crystal display according to an exemplary embodiment of the present invention.

Next, a liquid crystal display according to an exemplary embodiment of the present invention will be described with reference to FIG. 1B. FIG. 1B is a cross-sectional view of a liquid crystal display according to an exemplary embodiment of the present invention.

Referring to FIG. 1B, a liquid crystal display according to the present exemplary embodiment includes two display panels 100 and 200, and a liquid crystal layer 3 interposed therebetween.

The lower display panel 100 includes the first insulating substrate 110 and the first alignment layer 101a disposed on the first insulating substrate 110. The first alignment layer 101a includes the first alignment base layer 120 disposed on the first insulating substrate 110, the second alignment base layer 130 disposed on the first alignment base layer 120, and the first alignment control agent 140a disposed on the second alignment base layer 130.

The upper display panel 200 includes a second insulating substrate 210 and a second alignment layer 201a disposed on the second insulating substrate 210. The second alignment layer 201a includes a third alignment base layer 220 disposed on the second insulating substrate 210, a fourth alignment base layer 230 disposed on the third alignment base layer 220, and a second alignment control agent 240a disposed on the fourth alignment base layer 230.

The first alignment base layer 120 and the third alignment base layer 220 include the horizontal alignment material, and the second alignment base layer 130 and the fourth alignment base layer 230 include the vertical alignment material. The first alignment base layer 120 and the second alignment base layer 130, and the third alignment base layer 220 and the fourth alignment base layer 230, may be light-aligned. The first alignment control agent 140a and the second alignment control agent 240a are formed by photo-polymerizing the photo-polymerizable monomer or oligomer. The first alignment control agent 140a and the second alignment control agent 240a include a plurality of branches protruding from the alignment base layers 130 and 230. The first alignment base layer 120 and the second alignment base layer 130, the third alignment base layer 220 and the fourth alignment base layer 230, and the first alignment control agent 140a and the second alignment control agent 240a include the same material as the alignment base layer and the alignment control agent of FIG. 1A.

The first alignment layer 101a of the lower display panel 100 includes at least two of first regions and second regions that are light-aligned different directions, and the second alignment layer 201a of the upper display panel 200 includes at least two of third regions and fourth regions that are light-aligned in different directions.

The first region and the second region of the first alignment layer 101a of the lower display panel 100 may be light-aligned in opposite directions, and the third region and the fourth region of the second alignment layer 201a of the upper display panel 200 may be light-aligned in opposite directions.

Also, the light-alignment direction of the first region and the second region of the lower display panel 100 and the light-alignment direction of the third region and the fourth region of the upper display panel 200 may be perpendicular to each other.

In the shown exemplary embodiment, both alignment layers 101a and 201a of the lower display panel 100 and the upper display panel 200 include the alignment base layer including the horizontal alignment material and the alignment base layer including the vertical alignment material, however the alignment layer of at least one display panel of the two display panels 100 and 200 may include the alignment base layer including the horizontal alignment material and the alignment base layer including the vertical alignment material. Also, in the shown exemplary embodiment, both the lower display panel 100 and the upper display panel 200 include the alignment control agents 140a and 240a, and at least one display panel of the two display panels 100 and 200 may only include the alignment control agents 140a and 240a.

Although not shown, the signal lines such as the gate line and the data line, the switching element such as the thin film transistor (TFT), the pixel electrode connected to the switching element, the color filter, the light blocking member, and the common electrode may be formed on the first substrate 110 or the second substrate 210.

In this way, in the liquid crystal display according to an exemplary embodiment of the present invention, the alignment base layer is formed by depositing the horizontal alignment layer and the vertical alignment layer including the photo-polymerizable monomer or oligomer on the substrate, is light-aligned in the desired direction, and is then UV-irradiated to polymerize the photo-polymerizable monomer or oligomer thereby forming the alignment layer including the alignment control agent. Thereby, the pre-tilt of the liquid crystal director is fixed and aligned to have the desired pre-tilt direction and polar angle and simultaneously the pre-tilt may be reinforced, the multi-domain may be realized at the low grays, and the response speed of the liquid crystal molecules may be increased. Accordingly, a liquid crystal display having an excellent viewing angle for all grays may be obtained, and a fast response speed may be realized.

Figure 2A:
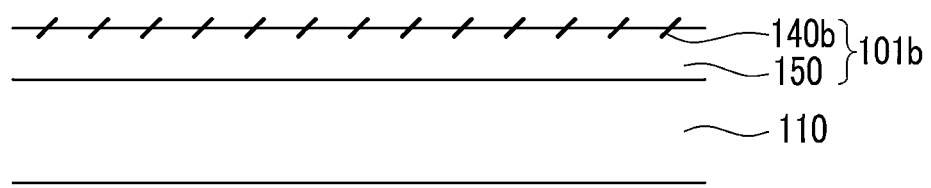
FIG. 2A is a cross-sectional view of a display panel for a liquid crystal display according to another exemplary embodiment of the present invention.
Figure 2B:
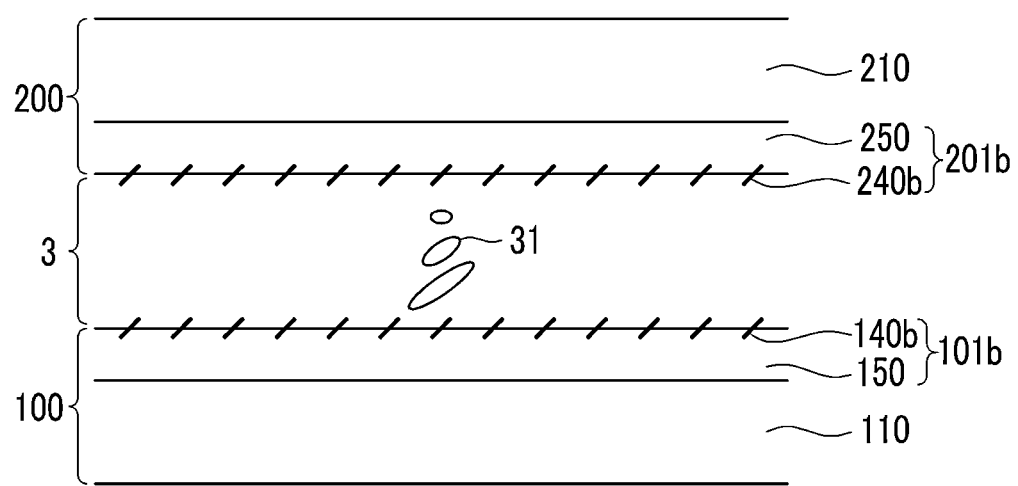
FIG. 2B is a cross-sectional view of a liquid crystal display according to another exemplary embodiment of the present invention.

Next, a display panel for a liquid crystal display and a liquid crystal display according to another exemplary embodiment of the present invention will be described with reference to FIG. 2A and FIG. 2B. FIG. 2A is a cross-sectional view of a display panel for a liquid crystal display according to another exemplary embodiment of the present invention, and FIG. 2B is a cross-sectional view of a liquid crystal display according to the present exemplary embodiment of the present invention.

Referring to FIG. 2A, a display panel for a liquid crystal display according to an exemplary embodiment of the present invention includes an insulating substrate 110 and the third alignment layer 101b disposed on the insulating substrate 110. The third alignment layer 101b includes a fifth alignment base layer 150 of which a horizontal alignment material and a vertical alignment material are mixed, and a third alignment control agent 140b disposed on the fifth alignment base layer 150. The third alignment control agent 140b includes a plurality of branches protruding from the fifth alignment base layer 150.

Although not shown, the signal lines such as the gate line and the data line, the switching element connected to the signal lines such as the thin film transistor (TFT), and the pixel electrode connected to the switching element may be formed between the insulating substrate 110 and the third alignment layer 101b. Also, the color filter, the light blocking member, and the common electrode may be formed between the insulating substrate 110 and the third alignment layer 101b.

The fifth alignment base layer 150 is light-aligned, and may include at least one of the materials such as PI, nylon, PVC, and PVA. The fifth alignment base layer 150 may be formed by mixing the vertical alignment material with a solution in which the solvent, NMP (n-methyl-pyrrolidone), BL (butyrolactone), and BC (butoxyethanol) are mixed in a ratio of 3:4:3 and mixing it with the horizontal alignment layer. The polar angle of the pre-tilt by the fifth alignment base layer 140 is changed according to the amount (weight percent: wt %) of the vertical alignment layer material.

As described above, the horizontal alignment layer has a polar angle of about 4-5° and the vertical alignment layer has a polar angle of about 89-90° such that it is difficult to form the four stable domains in the twisted nematic mode.

In the case of the display panel for a liquid crystal display according to an exemplary embodiment of the present invention, the fifth alignment base layer 150 includes the horizontal alignment material and the vertical alignment material thereby realizing the polar angle having the middle value between the polar angles of the horizontal alignment layer and the vertical alignment layer by the combination of the anchoring energy of the horizontal alignment layer and the vertical alignment layer.

Also, the alignment layer 101b includes the third alignment control agent 140b disposed on the fifth alignment base layer 150 thereby fixing the pre-tilt angle and the direction of the liquid crystal directors such that the response speed of the liquid crystal molecules may be increased. The third alignment control agent 140b may include the same material as the alignment control agent described with reference to FIG. 1A.

Next, a liquid crystal display according to an exemplary embodiment of the present invention will be described with reference to FIG. 2B.

Referring to FIG. 2B, a liquid crystal display according to the present exemplary embodiment includes two display panels 100 and 200, and a liquid crystal layer 3 interposed therebetween.

The lower display panel 100 includes the first insulating substrate 110 and the third alignment layer 101b disposed on the first insulating substrate 110. The third alignment layer 101b includes the fifth alignment base layer 150 and the third alignment control agent 140b disposed on the fifth alignment base layer 150.

The upper display panel 200 includes the second insulating substrate 210 and a fourth alignment layer 201b disposed on the second insulating substrate 210. The fourth alignment layer 201b includes a sixth alignment base layer 250 and a fourth alignment control agent 240b disposed on the sixth alignment base layer 250.

The fifth alignment base layer 150 and the sixth alignment base layer 250 may be mixed with the horizontal alignment material and the vertical alignment material, and the fifth alignment base layer 150 and the sixth alignment base layer 250 may be light-aligned. The third alignment control agent 140b and the fourth alignment control agent 240b are formed by photo-polymerizing the photo-polymerizable monomer or oligomer. The third alignment control agent 140b and the fourth alignment control agent 240b include a plurality of branches protruding from the fifth alignment base layer 150 and the sixth alignment base layer 250.

The fifth alignment base layer 150 and the sixth alignment base layer 250, and the third alignment control agent 140b and the fourth alignment control agent 240b, include the same material as the alignment base layer and the alignment control agent described in FIG. 1A.

The first alignment layer 101a of the lower display panel 100 includes at least two of first regions and second regions that are light-aligned in different directions, and the second alignment layer 201a of the upper display panel 200 includes at least two of third regions and fourth regions that are light-aligned in different directions.

The first region and the second region of the first alignment layer 101a of the lower display panel 100 may be light-aligned in opposite directions, and the third region and the fourth region of the second alignment layer 201a of the upper display panel 200 may be light-aligned in opposite directions.

Also, the light-alignment directions of the first region and the second region of the lower display panel 100 and the light-alignment directions of the third region and the fourth region of the upper display panel 200 may be perpendicular to each other.

In the shown exemplary embodiment, both alignment layers 101b and 201b of the lower display panel 100 and the upper display panel 200 include the mixture base layer including the horizontal alignment material and the vertical alignment material, however only the alignment layer of at least one display panel of the two display panels 100 and 200 may include the mixture base layer including the horizontal alignment material and the vertical alignment material. Also, in the shown exemplary embodiment, the lower display panel 100 and the upper display panel 200 both include the alignment control agents 140b and 240b, however only at least one display panel of the display panels 100 and 200 may only include the alignment control agent 140b and 240b.

Although not shown, the signal lines such as the gate line and, the data line, the switching element such as the thin film transistor (TFT), the pixel electrode connected to the switching element, the color filter, the light blocking member, and the common electrode may be formed on the first substrate 110 or the second substrate 210.

In the case of the display panel for a liquid crystal display according to an exemplary embodiment of the present invention, the fifth alignment base layer 150 and the sixth alignment base layer 250 in which the horizontal alignment material and the vertical alignment material are mixed are included, thereby realizing the pre-tilt polar angle having the middle value between the pre-tilt polar angles of the horizontal alignment layer and the vertical alignment layer by the combination of the anchoring energy of the horizontal alignment layer and the vertical alignment layer.

Also, the alignment layers 101b and 201b include the third alignment control agent 140b and the fourth alignment control agent 240b disposed on the fifth alignment base layer 150 and the sixth alignment base layer 250, and thereby the pre-tilt angle and the direction of the liquid crystal directors may be changed by the pre-tilt of the alignment control agents 140b and 240b and the response speed of the liquid crystal molecules may be increased.

Figure 3A:
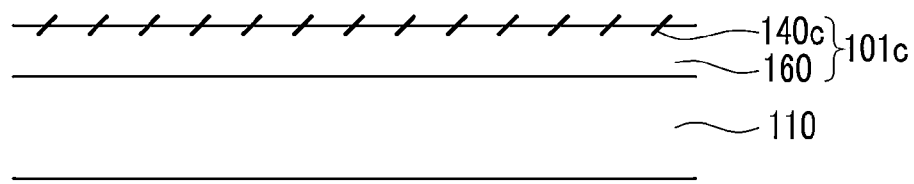
FIG. 3A is a cross-sectional view of a display panel for a liquid crystal display according to another exemplary embodiment of the present invention.
Figure 3B:
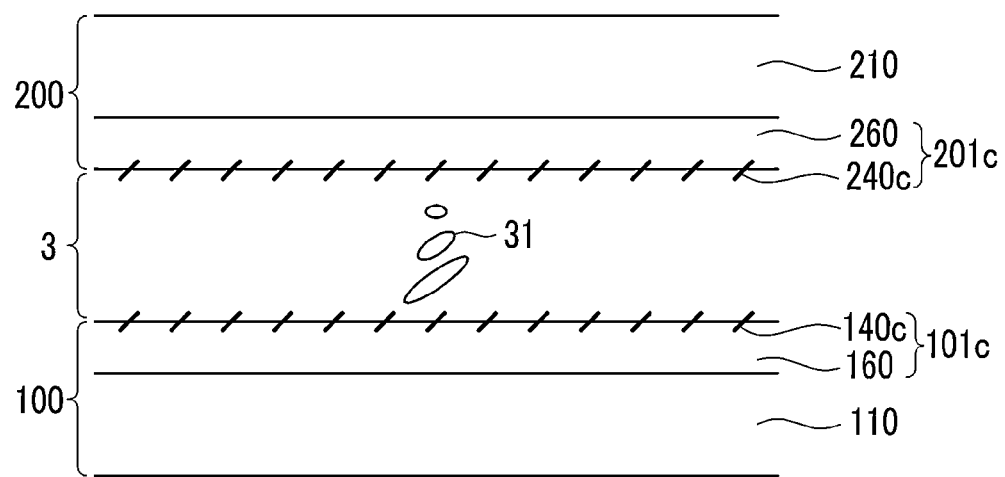
FIG. 3B is a cross-sectional view of a liquid crystal display according to another exemplary embodiment of the present invention.

Next, a display panel for a liquid crystal display and a liquid crystal display according to another exemplary embodiment of the present invention will be described with reference to FIG. 3A and FIG. 3B. FIG. 3A is a cross-sectional view of a display panel for a liquid crystal display according to another exemplary embodiment of the present invention, and FIG. 3B is a cross-sectional view of a liquid crystal display according to the present exemplary embodiment of the present invention.

Referring to FIG. 3A, a display panel for a liquid crystal display according to an exemplary embodiment of the present invention includes an insulating substrate 110 and a fifth alignment layer 101c disposed on the insulating substrate 110. The fifth alignment layer 101c includes s seventh alignment base layer 160 and a fifth alignment control agent 140c disposed on the seventh alignment base layer 160. The seventh alignment base layer 160 may be the horizontal alignment layer, and the seventh alignment base layer 160 may be light-aligned and may include at least one of the materials such as nylon, PVC, and PVA. The fifth alignment control agent 140c includes a plurality of branches protruding from the seventh alignment base layer 160.

The seventh alignment base layer 160 and the fifth alignment control agent 140c may include the same material as the alignment base layer and the alignment control agent described with reference to FIG. 1A.

Although not shown, the signal lines such as the gate line, the data line, the switching element connected to the signal lines such as the thin film transistor (TFT), and the pixel electrode connected to the switching element may be formed between the insulating substrate 110 and the fifth alignment layer 101c. Also, the color filter, the light blocking member, and the common electrode may be formed between the insulating substrate 110 and the fifth alignment layer 101c.

Next, a liquid crystal display according to an exemplary embodiment of the present invention will be described with reference to FIG. 3B.

Referring to FIG. 3B, a liquid crystal display according to the present exemplary embodiment includes two display panels 100 and 200, and a liquid crystal layer 3 interposed therebetween.

The lower display panel 100 includes the first insulating substrate 110 and the fifth alignment layer 101c disposed on the first insulating substrate 110. The fifth alignment layer 101c includes the seventh alignment base layer 160 and the fifth alignment control agent 140c, and includes a plurality of branches protruding from the seventh alignment base layer 160.

The upper display panel 200 includes the second insulating substrate 210 and the sixth alignment layer 201c disposed on the second substrate 210. The sixth alignment layer 201c includes an eighth alignment base layer 260 disposed on the second insulating substrate 210 and a sixth alignment control agent 240c including a plurality of branches protruding from the eighth alignment base layer 260.

The seventh alignment base layer 160 and the eighth alignment base layer 260 include the horizontal alignment material, and the seventh alignment base layer 160 and the eighth alignment base layer 260 may be light-aligned. The fifth alignment control agent 140c and the sixth alignment control agent 240c are formed by photo-polymerizing the photo-polymerizable monomer or oligomer. The fifth alignment control agent 140c and the sixth alignment control agent 240c include a plurality of branches protruding from the seventh alignment base layer 160 and the eighth alignment base layer 260.

The seventh alignment base layer 160 and the eighth alignment base layer 260, and the fifth alignment control agent 140c and the sixth alignment control agent 240c, may include the same material as the alignment base layer and the alignment control agent of FIG. 1A.

The first alignment layer 101c of the lower display panel 100 includes at least two of first region and second region that are light-aligned in the different directions, and the second alignment layer 201c of the upper display panel 200 includes at least two of third region and fourth region that are light-aligned in the different directions.

The first region and the second region of the first alignment layer 101c of the lower display panel 100 may be light-aligned in opposite directions, and the third region and the fourth region of the second alignment layer 201c of the upper display panel 200 may be light-aligned in opposite directions.

Also, the light-alignment directions of the first region and the second region of the lower display panel 100 and the light-alignment directions of the third region and the fourth region of the upper display panel 200 may be perpendicular to each other.

Also, in the shown exemplary embodiment, the lower display panel 100 and the upper display panel 200 both include the alignment control agents 140c and 240c, however only at least one display panel of the display panels 100 and 200 may include the alignment control agent 140c and 240c.

Although not shown, the signal lines such as the gate line and the data line, the switching element such as the thin film transistor (TFT), the pixel electrode connected to the switching element, the color filter, the light blocking member, and the common electrode may be formed on the first substrate 110 or the second substrate 210.

Also, the alignment layers 101c and 201c include the fifth alignment control agent 140c and the sixth alignment control agent 240c disposed on the seventh alignment base layer 160 and the eighth alignment base layer 260, and thereby the pre-tilt angle and the direction of the liquid crystal directors may be changed by the pre-tilt of the alignment control agents 140c and 240c and the response speed of the liquid crystal molecules may be fast.

In the above described exemplary embodiment, the liquid crystal layer 3 may include the twisted nematic (TN) liquid crystal molecules. However, the liquid crystal layer 3 may include vertical alignment (VA) liquid crystal molecules.

Figure 4A:
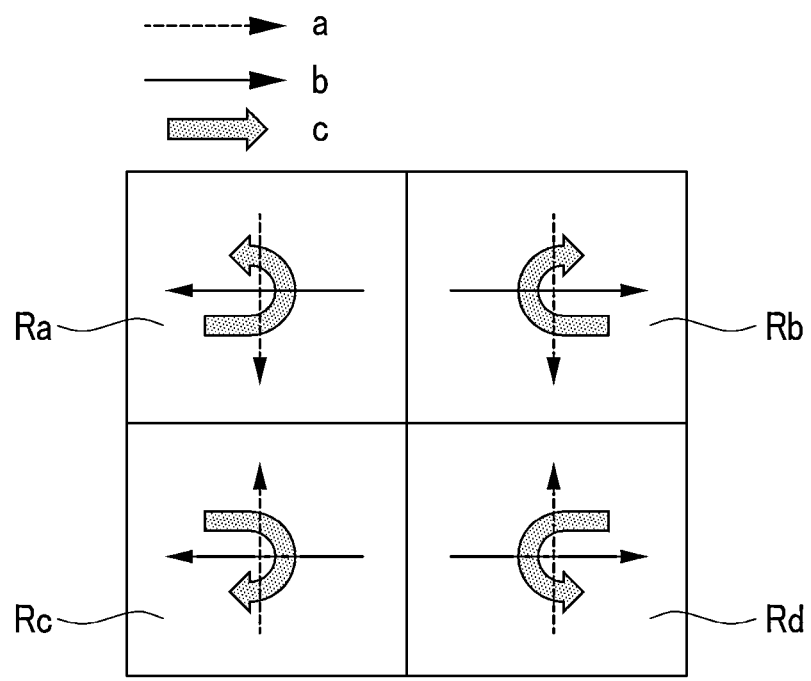
FIG. 4A and FIG. 4B are views conceptually showing a method for forming a multi-domain of a liquid crystal display according to an exemplary embodiment of the present invention.
Figure 4B:
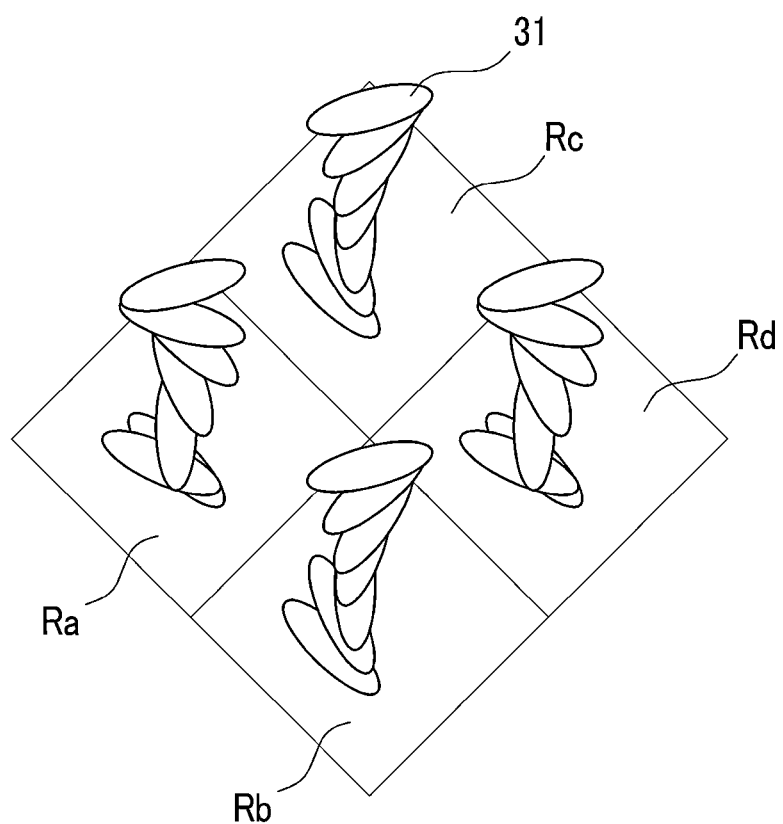

Next, a method for forming a multi-domain of a liquid crystal display according to an exemplary embodiment of the present invention will be described with reference to FIG. 4A and FIG. 4B. FIG. 4A and FIG. 4B are views conceptually showing a method of forming a multi-domain of a liquid crystal display according to an exemplary embodiment of the present invention. FIG. 4A is a view conceptually showing a light-alignment direction of an alignment layer, and FIG. 4B is a view conceptually showing an arrangement of a liquid crystal director according to the light-alignment of FIG. 4A.

In FIG. 4A, "a" indicates a light-alignment direction of a lower display panel 100, "b" indicates a light-alignment direction of an upper display panel 200, and "c" indicates an arrangement direction of the liquid crystal director.

Referring to FIG. 4A, the alignment layers of the lower display panel 100 are light-aligned in opposite directions such that they are divided into the first sub-regions Ra and Rb aligned in the first direction and the second sub-regions Rc and Rd aligned in the second direction. Here, the alignment layers of the lower display panel 100 may have one of the several alignments of the previous exemplary embodiments.

The alignment layers of the upper display panel 200 are light-aligned in opposite directions such that they are divided into the third sub-regions Ra and Rb aligned in the third direction and the fourth sub-regions Rc and Rd aligned in the fourth direction. Here, the alignment layers of the upper display panel 200 may have one of the several alignments of the previous exemplary embodiments.

Next, the lower display panel 100 and the upper display panel 200 are combined, thereby forming four regions Ra, Rb, Rc, and Rd such that the liquid crystal molecules 31 are aligned in the different directions, as shown in FIG. 4B. In this way, four domains having different alignment directions are formed thereby increasing the viewing angle. Here, the liquid crystal display according to an exemplary embodiment of the present invention uses the alignment layer including the horizontal alignment layer and the vertical alignment layer such that the liquid crystal molecules may be aligned to have the desired pre-tilt polar angle.

Figure 5:
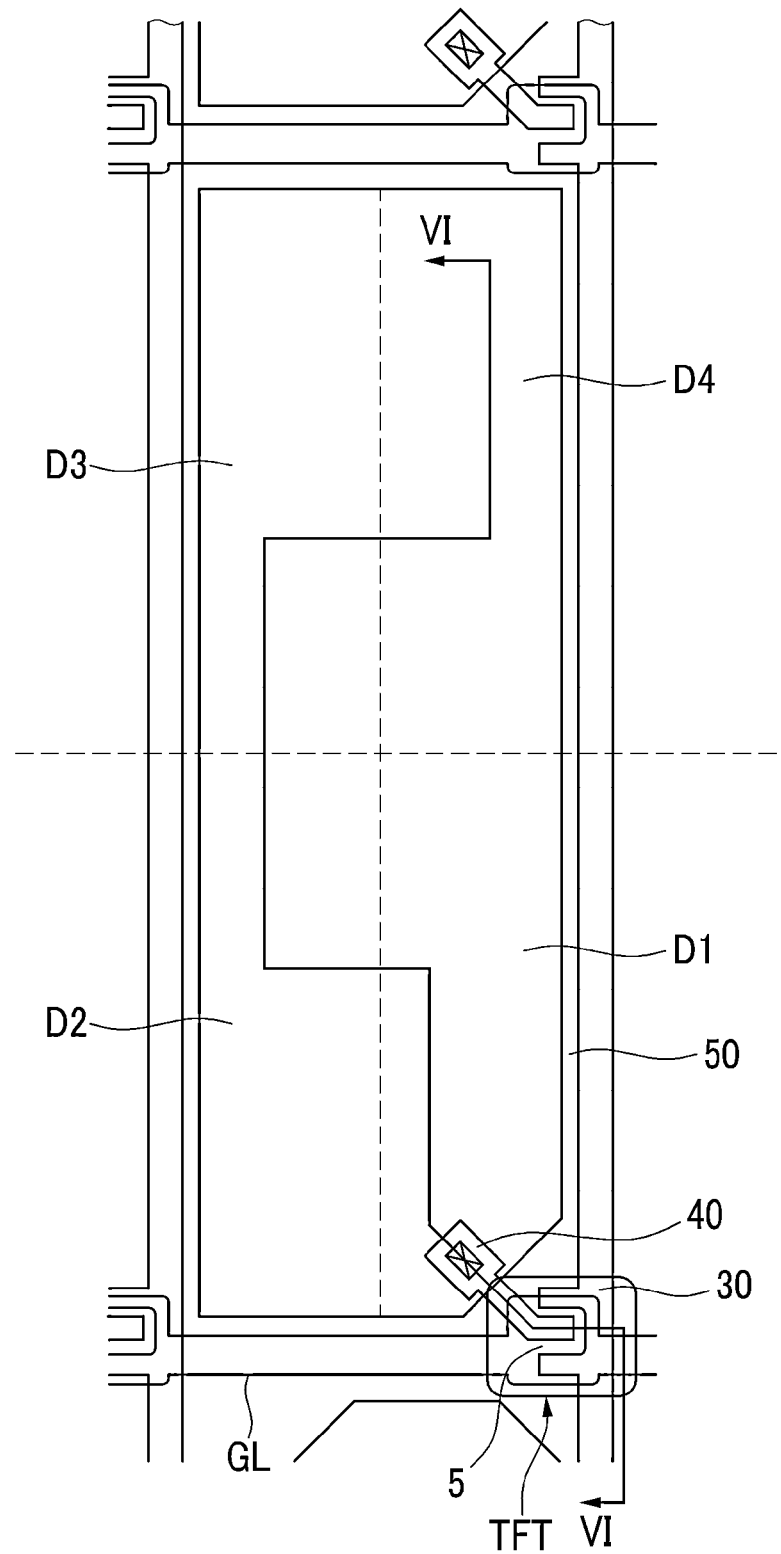
FIG. 5 is a layout view of a liquid crystal display according to an exemplary embodiment of the present invention.

Next, one example of a liquid crystal display according to an exemplary embodiment of the present invention will be described with reference to FIG. 5 and FIG. 6. FIG. 5 is a layout view of a liquid crystal display according to an exemplary embodiment of the present invention, and FIG. 6 is a cross-sectional view of the liquid crystal display shown in FIG. 5 taken along the line VI-VI.

Figure 6:
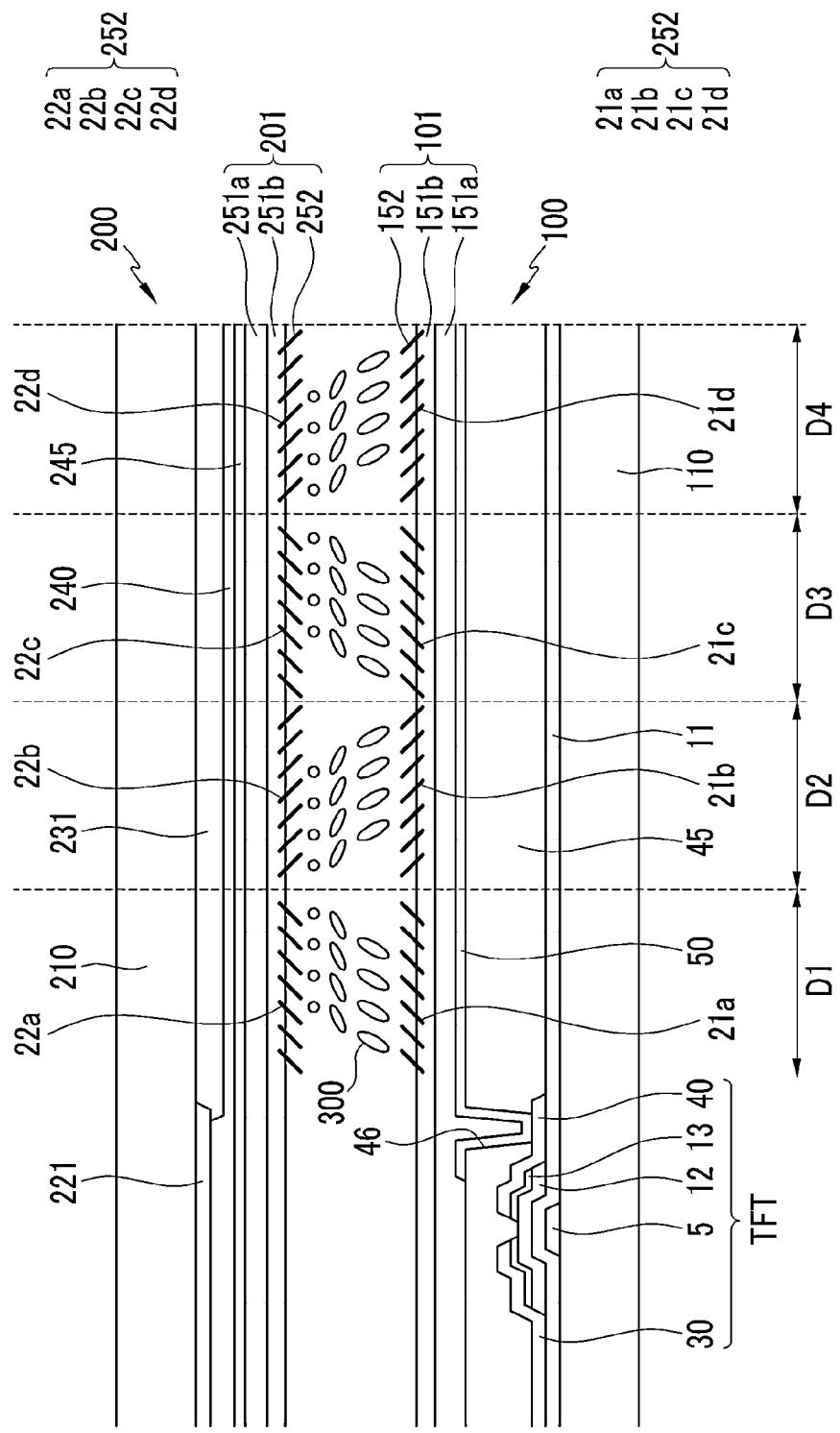
FIG. 6 is a cross-sectional view of the liquid crystal display shown in FIG. 5 taken along the line VI-VI.

Referring to FIG. 5 and FIG. 6, a liquid crystal display according to the present exemplary embodiment includes a lower display panel 100 and an upper display panel 200, and a liquid crystal layer 300 interposed between the two display panels 100 and 200. The liquid crystal layer 300 may include the liquid crystal having dielectric ratio anisotropy.

The first display panel 100 will be described. A gate line GL, a data line DL, a thin film transistor TFT connected to the gate line GL and the data line DL, a pixel electrode 50 connected to the thin film transistor TFT, and the first alignment layer 101 disposed on the first insulating substrate 1.

The gate line GL include a gate electrode 5, and the thin film transistor TFT includes the gate electrode 5, a gate insulating layer 11 formed on the gate electrode 5, a semiconductor layer 12 and an ohmic contact layer 13 formed on the gate insulating layer 11, and a source electrode 30 formed on the ohmic contact layer 13 and connected to the data line DL and a drain electrode 40.

A passivation layer 45 is formed on the gate insulating layer 11 and the thin film transistor TFT, and the drain electrode 40 is connected to the pixel electrode 50 through a contact hole 46 formed in the passivation layer 45.

The first alignment layer 101 includes a first alignment base layer 151a, a second alignment base layer 151b, and a first alignment control agent 152.

The first alignment base layer 151a includes the horizontal alignment material, and the second alignment base layer 151b includes the vertical alignment material. The first alignment base layer 151a and the second alignment base layer 151b may include at least one of polymer-based materials, for example, materials of a polyamic acid, a polyimide, nylon, PVA (polyvinylalcohol), and PVC.

The first alignment base layer 151a and the second alignment base layer 151b include a light alignment material, and may be light-aligned. In detail, the light-alignment material may be divided into a photolysis material, a photo-isomer material, photo-hardening material, and photo-polymerization material according to the kind of reaction to the light. In the case of the photolysis material, the decomposition of the polymer chain is anisotropically generated by the polarized UV such that the light-alignment may be realized through the structural anisotropy generated by the polarized UV. For example, if a polyimide is irradiated by the polarized UV, the chain is disconnected and an oxidation reaction occurs. The above described materials may have high thermal stability. The photo-isomerizing material is changed into a cis/trans isomer by the light such that the light-alignment is realized in the generated direction. The photo-hardening material is light-aligned by having the anisotropy through the selective reaction of the light reaction group in the polarized direction by the polarized UV.

The photo-polymerizing material is photo-polymerized under the light irradiation thereby forming a polymer having the pre-tilt.

The light-alignment material may includes a high molecular material selected from the group including a polyimide, a polyamic acid, polynorbornene, a phenyl maleimide copolymer, polyvinylcinnamate, polyazobenzene, polyethyleneimine, polyvinyl alcohol, a polyamide, polyethylene, polystyrene, polyphenylenephthalamide, polyester, polyurethane, polysiloxanecinnamate, a cellulosecinnamate compound, and a polymethyl methacrylate compound.

The first alignment base layer 151a and the second alignment base layer 151b may have the pre-tilt, and the azimuthal angle and the polar angle may be changed according to the light polarized direction and/or the inclination degree of the substrate under the irradiation of the light.

The first alignment control agent 152 is formed by polymerizing the photo-polymerizable monomer or oligomer, and as an example of the photo-polymerizable monomer or oligomer, the reactive mesogen (RM), NOA series manufactured by Norland, Co., Ltd., and the like may be used.

The term "reactive mesogen" (RM) means a polymerizable mesogenic compound. The term "mesogenic material" or 'mesogenic compound' includes materials or compounds including one or more rod-shaped, board-shaped, or disk-shaped mesogenic groups, i.e., groups with the ability to induce liquid crystal phase behavior. Liquid crystal compounds with rod-shaped or board-shaped groups are also known in the art as "calamitic" liquid crystals. Liquid crystal compounds with a disk-shaped group are also known in the art as "discotic" liquid crystals. The compounds or materials including mesogenic groups do not necessarily have to exhibit a liquid crystal phase themselves. It is also possible that they show liquid crystal phase behavior only in mixtures with other compounds, or when the mesogenic compounds or materials, or the mixtures thereof, are polymerized.

The reactive mesogen is polymerized by light such as ultraviolet rays, and is a material that is aligned according to an alignment state of the adjacent material. Examples of the reactive mesogen may be a compound that is represented by the following formula.

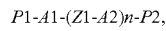

Herein, P1 and P2 are independently selected from acrylate, methacrylate, vinyl, vinyloxy, and epoxy groups, A1 and A2 are independently selected from 1,4-phenylene and naphthalene-2,6-diyl groups, Z1 is any one of COO—, OCO—, and single bonds, and n is any one of 0, 1, and 2.

In more detail, it may be a compound that is represented by any one of the following formulas.

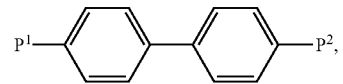

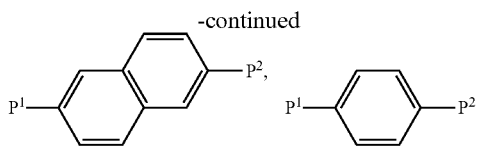

Herein, P1 and P2 are independently selected from acrylate, methacrylate, vinyl, vinyloxy, and epoxy groups.

The first alignment control agent 152 includes a plurality of branches 21a, 21b, 21c, and 21d protruding outside from the second alignment base layer 151b to have the pre-tilt.

The pre-tilt of the first alignment control agent 152 may be changed according to the pre-tilt of the alignment base layers 151a and 151b, the alignment direction of the liquid crystal layer 300, or the light irradiation process.

Next, the upper display panel 200 will be described.

The upper display panel 200 includes a light blocking member 221 disposed on the second insulating substrate 210, a color filter 231 mainly disposed in an opening defined by the light blocking member 221 disposed on the second insulating substrate 210, an overcoat 240 covering the color filter 231 and the light blocking member 221, a common electrode 245 disposed on the overcoat 240, and a second alignment layer 201 disposed on the common electrode 245.

The second alignment layer 201 includes a third alignment base layer 251a, a second alignment control agent 252 disposed on the third alignment base layer 251a, and a fourth alignment base layers 251b disposed thereon.

The third alignment base layer 251a includes the horizontal alignment material, and the fourth alignment base layer 251b includes the vertical alignment material. The third alignment base layer 251a and the fourth alignment base layer 251b are light-aligned, and include the light-alignment material.

The second alignment control agent 252 is formed by photo-polymerizing the photo-polymerizable monomer or oligomer, like the first alignment control agent 152. The second alignment control agent 252 includes a plurality of branches 22a, 22b, 22c, and 22d protruding outside from the fourth alignment base layer 251b to have the pre-tilt.

The liquid crystal layer 300 is interposed between the lower display panel 100 and the upper display panel 200, and includes a plurality of liquid crystal molecules having the dielectric ratio anisotropy. The liquid crystal molecules may be arranged according to the pre-tilt of the first alignment layer 101 and the second alignment layer 201.

In the shown exemplary embodiment, one pixel of the liquid crystal display according to the present exemplary embodiment has four domains D1, D2, D3, and D4 that are aligned to have the different azimuthal angles.

However, the liquid crystal display according to another exemplary embodiment of the present invention may include a pixel having domains of a different number, and may be applied to a liquid crystal display including a plurality of domains.

Figure 7:
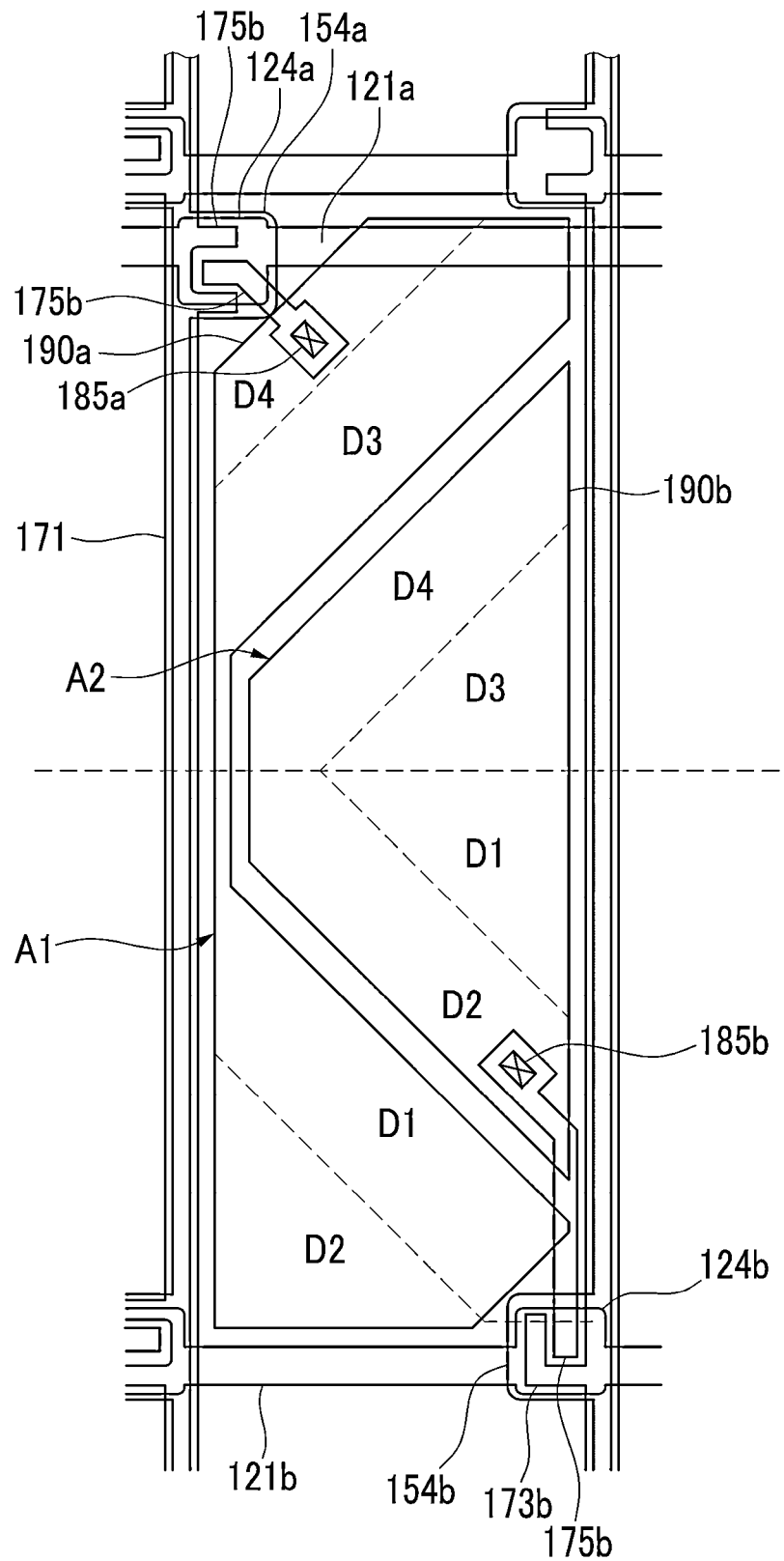
FIG. 7 is a layout view of a liquid crystal display according to another exemplary embodiment of the present invention.

Next, a liquid crystal display according to another exemplary embodiment of the present invention will be described with reference to FIG. 7. FIG. 7 is a layout view of a liquid crystal display according to another exemplary embodiment of the present invention.

Referring to FIG. 7, the first display panel 100 includes first and second gate lines 121a and 121b that are extended in the horizontal direction, are separated from each other, and transmit gate signals.

The first and second gate lines 121a and 121b include first and second gate electrodes 124a and 124b disposed above and below, and protruding upward and downward.

A gate insulating layer 11 is formed on the first and second gate electrodes 124a and 124b, and a semiconductor layer 154a and 154b and an ohmic contact layer (not shown) are formed on the gate insulating layer 11.

First and second source electrodes 173a and 173b and first and second drain electrodes 175a and 175b are formed on the ohmic contact layer. The first/second gate electrode 124a/124b, the first/second source electrode 173a/173b and the first/second drain electrode 175a/175b form the first/second thin film transistor TFT1/TFT2 along with the semiconductor layer 154a and 154b.

A passivation layer 45 having contact holes 185a and 185b is formed on the gate insulating layer 11, the first and second source electrodes 173a and 173b, the first and second drain electrodes 175a and 175b, and the semiconductor layer 12.

A plurality of pixel electrodes including first and second sub-pixel electrodes 190a and 190b are formed on the passivation layer 45. The first and second sub-pixel electrodes 190a and 190b are physically and electrically connected to the first and second drain electrodes 175a and 175b through the contact holes 185a and 185b, thereby receiving the data voltage from the first and second drain electrodes 175a and 175b.

The first sub-pixel electrode 190a is positioned in the first region A1 that is divided into a first domain to a fourth domain D1 to D4, and the second sub-pixel electrode 190b is positioned in the second region A2 and is divided into a first domain to a fourth domain D1 to D4. The first sub-pixel electrode 190a is applied with a higher voltage than the second sub-pixel electrode 190b. Accordingly, all liquid crystal molecules of the liquid crystal layer 300 are instantly inclined according to the pre-tilt of the liquid crystal molecules adjacent to the first alignment layer 151 under the initial application of the voltage such that the response speed is improved. Also, the inclination angles of the liquid crystal molecules positioned in the different domains are differentiated such that the lateral visibility is improved, and the inclination angles of the liquid crystal molecules may be differently maintained by the first sub-pixel electrode 190a and the second sub-pixel electrode 190b that are disposed in the different regions and are driven by different voltages after the passage of a predetermined time after the initial application of the voltage such that the lateral visibility may be improved. In detail, the voltages of the first region A1 and the second region A2 are respectively controlled by the first and second thin film transistors such that the gamma curve lines of each region may be controlled. Accordingly, the combination gamma curve lines of each region are close to the front reference gamma curve line such that the lateral visibility may be improved.

The alignment layer having the pre-tilt is formed at the first and second sub-pixel electrodes 190a and 190b. The first alignment layer (not shown) includes the alignment base layer (not shown) and the first alignment control agent (not shown) that are light-aligned and include the horizontal alignment material and the vertical alignment material, like the exemplary embodiment shown in FIG. 5 and FIG. 6.

The upper display panel is similar to the upper display panel 200 of the liquid crystal display according to the exemplary embodiment shown in FIG. 5 and FIG. 6 such that the detailed description is omitted.

The second alignment layer of the upper display panel also includes the alignment base layer (not shown) and the first alignment control agent (not shown) that are light-aligned and include the horizontal alignment material and the vertical alignment material, like the exemplary embodiment described with reference to FIG. 5 and FIG. 6.

Figure 8:
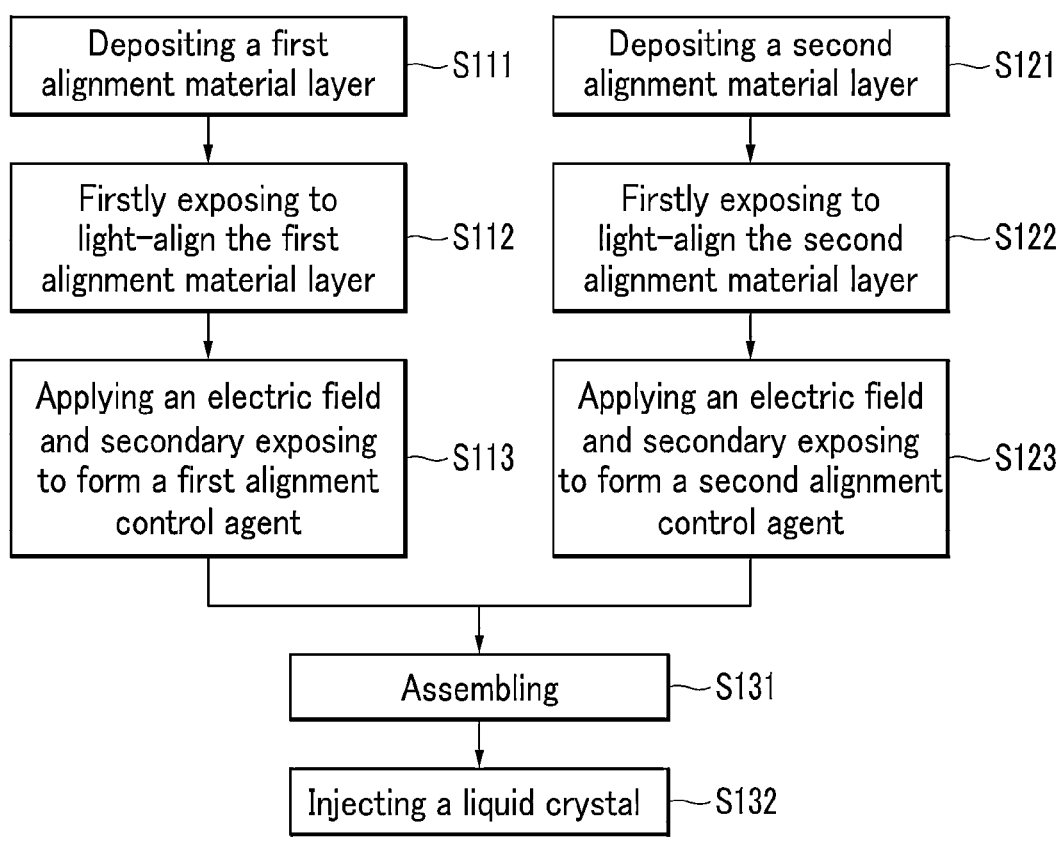
FIG. 8 is a flowchart showing a manufacturing method of a liquid crystal display according to an exemplary embodiment of the present invention.

Next, a manufacturing method of a liquid crystal display according to an exemplary embodiment of the present invention will be described with reference to FIG. 8 to FIG. 11 as well as FIG. 5 and FIG. 6. FIG. 8 is a flowchart showing a manufacturing method of a liquid crystal display according to an exemplary embodiment of the present invention, and FIG. 9A to FIG. 11 are cross-sectional views sequentially showing a liquid crystal display in a manufacturing method of a liquid crystal display according to an exemplary embodiment.

Referring to FIG. 8 and FIG. 9A, the first alignment material layer including the first alignment base layer 151a, the second alignment base layer 151b, and an alignment control material such as a photo-polymerizable monomer or oligomer are deposited on the first substrate (S111). Here, the first alignment base layer 151a includes the horizontal alignment material, and the second alignment base layer 151b includes the vertical alignment material. In detail, the horizontal alignment material layer is deposited, and the vertical alignment material layer in which the vertical alignment material and the alignment control material such as a photo-polymerizable monomer or oligomer are mixed is deposited thereon. After depositing the horizontal alignment material layer and providing the pre-tilt through the light-alignment, the vertical alignment material layer may be deposited.

A polymerization initiator may be added to the first alignment material as well as the alignment base material and the alignment control material such as photo-polymerizable monomer or oligomer. It is not absolutely necessary to add the polymerization initiator, however the polymerization may be speedily executed by adding it. As the polymerization initiator, benzoyl peroxide, cumene hydroperoxide, t-butyl peroctoate, dicumyl peroxide, methyl ethyl ketone peroxide, benzoyl alkyl ether based compounds, acetophenone based compounds, benzophenone based compounds, xanthone based compounds, benzoin ether based compounds, or benzyl ketal based compounds may be used, and they may be used as is or may be appropriately mixed. Also, it is preferable that the polymerization initiator is added at less than 10 weight % with respect to the polymerizable compound. When added at more than 10 weight %, the polymerization initiator may function as an impurity such that the display quality of the display device may be deteriorated.

Next, the first alignment material layer including the first alignment base layer 151a and the second alignment base layer 151b is primarily exposed to light-align the first alignment material layer (S112).

This will be described in detail. The first substrate 1 including the first alignment material layer is irradiated with the light, for example ultraviolet (UV) rays to light-align the first alignment material layer. Here, the ultraviolet rays may be polarized ultraviolet rays, for example linear polarized, oval polarized, or circle polarized rays. Also, the ultraviolet rays may be not polarized, and in this case, a polarizing plate is used close to the substrate 1 to irradiate the polarized UV to the substrate.

Firstly, as shown in FIG. 9A, the linear polarized ultraviolet rays are irradiated to the regions corresponding to the first domain D1 in the first direction to form the first domain D1 that is aligned in the first azimuthal angle. Here, the remaining regions except for the first domain D1 are not exposed to ultraviolet rays because of using a mask 600. The linear polarized ultraviolet rays are irradiated in the first direction to form the first domain D1 such that the portion of the photo-polymerizable monomer or oligomer included in the first alignment material layer is polymerized in the polymer at the surface of the first alignment material layer, and thereby a plurality of the first branches 21a having the first azimuthal angle may be extended from the first alignment material layer disposed in the first domain D1. These first branches 21a may enhance the alignment force of the alignment base material.

Next, as shown in FIG. 9B, the linear polarized ultraviolet rays in the second direction are irradiated to the regions corresponding to the second domain D2 to form the second domain D2 that is aligned to have the second azimuthal angle. Here, a plurality of the second branches 21b having the second azimuthal angle may be extended from the first alignment material layer disposed in the second domain D2.

Figure 9C:
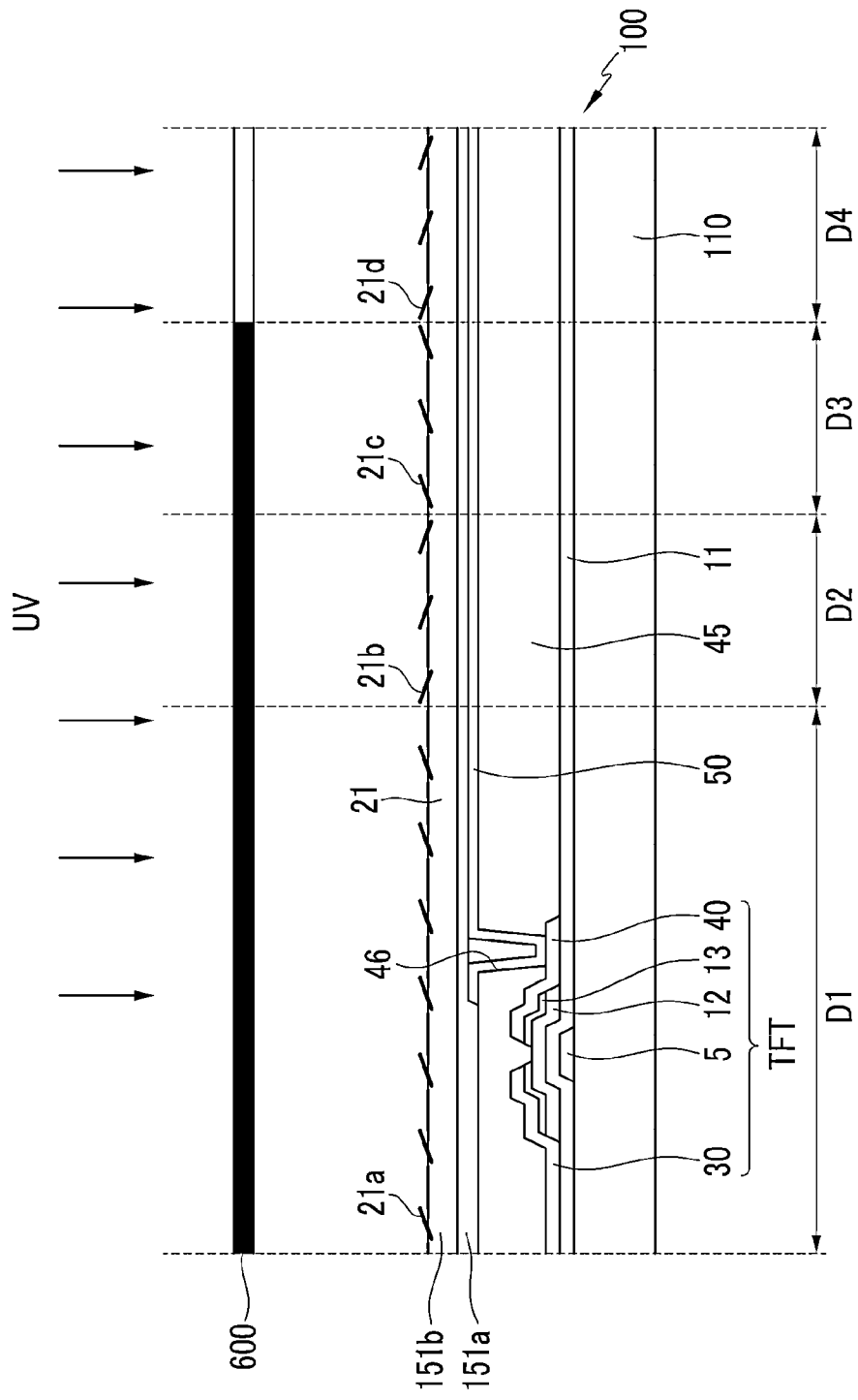
FIG. 9A to FIG. 11 are cross-sectional views sequentially showing a liquid crystal display in a manufacturing method of a liquid crystal display according to an exemplary embodiment.

Similarly, the linear polarized ultraviolet rays in the third direction are irradiated to the regions corresponding to the third domain D3 to form the third domain D3 that is aligned to have the third azimuthal angle and a plurality of the third branches 21c. Finally, as shown in FIG. 9C, the linear polarized ultraviolet rays in the fourth direction are irradiated to the regions corresponding to the fourth domain D4 to form the fourth domain D4 that is aligned to have the fourth azimuthal angle and a plurality of the fourth branches 21d.

In this way, when light-aligning the first alignment material layer including the first alignment base layer 151a and the second alignment base layer 151b, the ultraviolet rays having the different polarized directions or polarized shapes are irradiated every in domain to differentiate the azimuthal angles of the alignment layer per domain.

In each of the domains D1, D2, D3, and D4, the azimuthal angle of the first alignment base layer 151a and the second alignment base layer 151b may be in the same direction as the polarized direction of the irradiated ultraviolet rays or the vertical direction according to the characteristics of the material. However, it is not limited thereto, and the azimuthal angle of the first alignment base layer 151a and the second alignment base layer 151b may be changed according to the light-alignment characteristics or reaction of the alignment base material.

Figure 10:
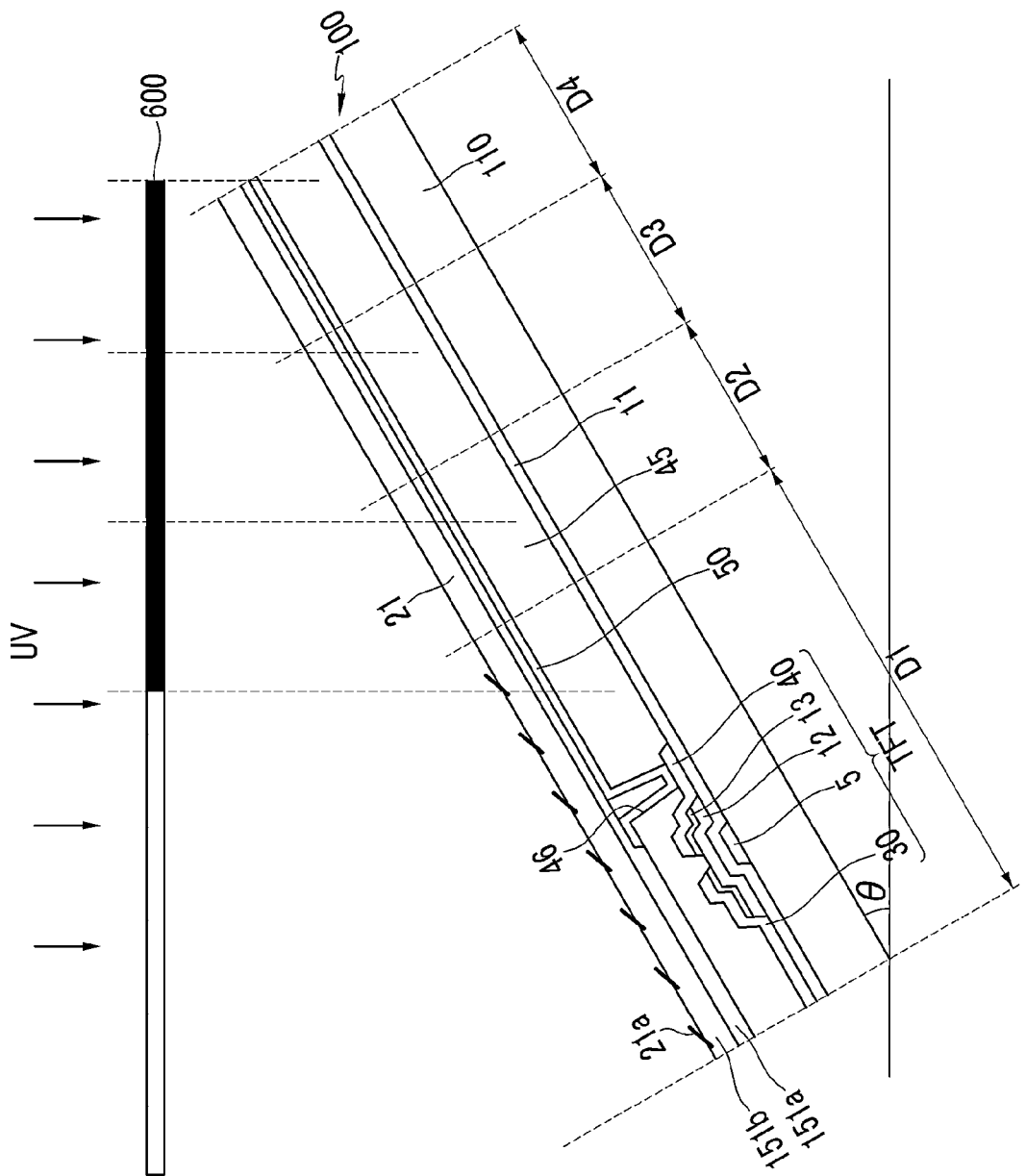

When light-aligning the first alignment material layer including the first alignment base layer 151a and the second alignment base layer 151b to form the domains D1, D2, D3, and D4, the polar angle of the pre-tilt may be controlled in each domain. This will be described with reference to FIG. 10. As shown in FIG. 10, when the ultraviolet rays are irradiated to the regions corresponding to the first domain D1 for the light-alignment of the first domain D1, the lower display panel 100 may be inclined in the first angle θ and the ultraviolet rays may be irradiated such that the polar angle of the first alignment base layer 151a and the second alignment base layer 151b may be different according to the inclination angle between the lower display panel 100 and the irradiation direction of the ultraviolet rays.

In the liquid crystal display according to the present exemplary embodiment, the first alignment base layer 151a includes the horizontal alignment material and the second alignment base layer 151b includes the vertical alignment material such that the polar angle having the middle value between the polar angles of the horizontal alignment layer and the vertical alignment layer by the combination of the anchoring energy of the first alignment base layer 120 and the second alignment base layer 130 may be realized when light-aligning the first alignment material layer.

In the present exemplary embodiment, referring to FIG. 9A to FIG. 9C, the process of irradiating the polarized ultraviolet rays in the different directions per domain and the process of irradiating ultraviolet rays after inclining the substrate at the predetermined angle with respect to the irradiation direction of the ultraviolet rays referring to FIG. 10 are separately described, however the two processes may be respectively executed, simultaneously executed, or sequentially executed.

Figure 11:
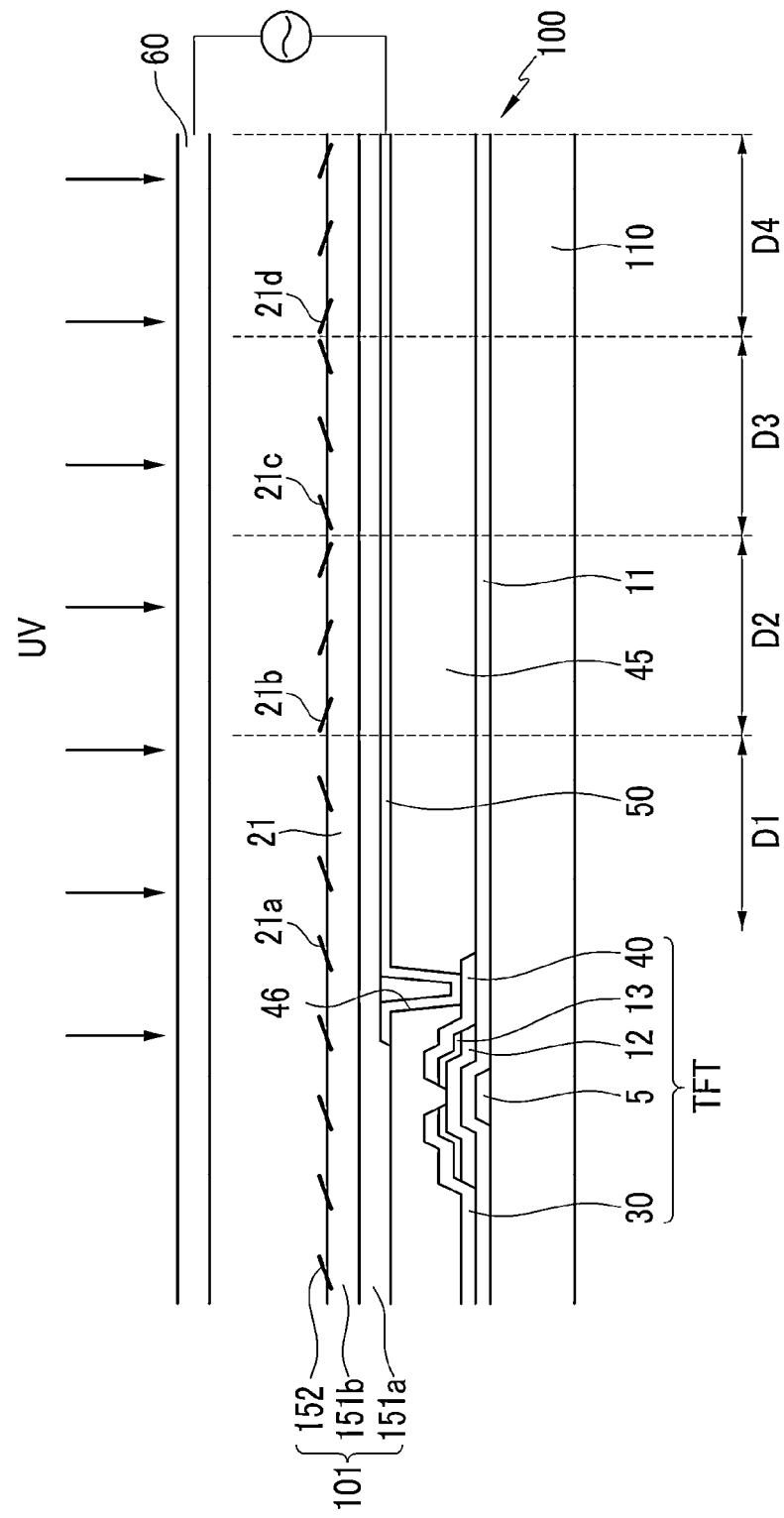

In this way, after light-aligning the first alignment material layer including the first alignment base layer 151a and the second alignment base layer 151b of the lower display panel 100, as shown in FIG. 11, after disposing a facing electrode 60, a secondary exposure is executed in the state in which the pixel electrode 50 and the facing electrode 60 are applied with a predetermined voltage to generate an electric field such that a plurality of branches 21a, 21b, 21c, and 21d and the alignment control material are arranged and polymerized to form the first alignment control agent 152 (S113). Here, the wavelength of the ultraviolet rays for the secondary exposure may be different from the wavelength of the ultraviolet rays for the light-alignment of the first alignment material layer.

The applying of the electric field to the alignment layer may be performed by using two electrodes that are previously formed on the substrates, or by using a separate apparatus. Accordingly, the application of the electric field may be separately executed for each substrate before assembling the upper and lower substrates (국문 의미를 좀더 명확히 하는 것이??).

Also, a solvent can be added into the alignment layer before applying the electric field. In a more detailed example, the solvent can be sprayed on the layer, or can be injected into the space between the first substrate and the second substrate after the first substrate and the second substrate on which the alignment layer is formed are coupled to each other. If the alignment layer is added, the viscosity of the alignment layer is decreased such that the photo-polymerizable monomer and oligomer may be further effectively arranged by the electric field. Here, the solvent can be, for example, propylene glycol methyl ether acetate (PGMEA) or an aromatic solvent such as toluene and xylene. After the photopolymerizable monomer or oligomer is rearranged by applying the electric field, the solvent can be removed by performing a vacuum removing process, a heating process, or an air drying process.

In this way, in the state in which the electric field is applied, the first alignment base layer 151a and the second alignment base layer 151b that are light-aligned to have the plurality of domains, and the plurality of branches 21a, 21b, 21c, and 21d that are extended from the first alignment base layer 151a and the second alignment base layer 151b, are secondarily exposed such that the plurality of branches 21a, 21b, 21c, and 21d and the alignment control material are polymerized thereby forming the first alignment control agent 152, and accordingly the first alignment layer 101 is completed.

If the electric field is applied to the alignment material layer, by the dielectric anisotropy of the alignment control material such as the photo-polymerizable monomer or oligomer, the plurality of branches extended from the alignment base layer and the alignment control material are reacted by the electric field, thereby arranging to have the predetermined pre-tilt. In this state, the plurality of branches and the alignment control material are polymerized, thereby being arranged in the desired directions.

Again referring to FIG. 8, like the light-alignment of the first alignment material layer and the formation of the first alignment control agent, the second alignment material layer is deposited on the second substrate (S121), the second alignment material layer is primarily exposed for the light-alignment (S122), and then the facing electrode (not shown) is disposed on the second substrate 210, the common electrode 245 and the facing electrode are applied with the predetermined voltage, and in the state in which the electric field is applied, the secondary exposure is executed thereby forming the second alignment control agent (S123). Accordingly, the second alignment layer 201 is completed.

Here, the second alignment material layer includes the third alignment base layer 251a having the horizontal alignment material layer, the fourth alignment base layer 251b having the vertical alignment material layer, and the alignment control material such as the photo-polymerizable monomer or oligomer. In detail, the horizontal alignment material layer is deposited, and the vertical alignment material layer of which the vertical alignment material and the alignment control material such as the photo-polymerizable monomer or oligomer are mixed is deposited thereon. After depositing the horizontal alignment material layer, the pre-tilt is formed through the light-alignment, and then the vertical alignment material layer may be deposited.

Next, the second alignment material layer including the third alignment base layer 251a and the fourth alignment base layer 251b is primarily exposed to light-align the first alignment material layer and to form the alignment control agent including a plurality of branches protruding from the third alignment base layer 251a and the fourth alignment base layer 251b, and then the ultraviolet rays having the different wavelength from the wavelength of the first exposure are irradiated to polymerize the plurality of branches and the alignment control agent, thereby completing the alignment control agent including a plurality of branches. Accordingly, the second alignment layer 201 including the third alignment base layer 251a, the fourth alignment base layer 251b, and the second alignment control agent 252 is completed.

When the first alignment layer 101 and the second alignment layer 201 are completed, the two display panels 100 and 200 are assembled (S131) and the liquid crystal layer 300 is injected (S132). The introduction of the liquid crystal may be performed by a method in which the liquid crystal is injected between the two substrates having the alignment layer including the photo-polymerizable monomer or oligomer. The liquid crystal molecules of the injected liquid crystal layer 300 are arranged according to the light-alignment characteristics of the first alignment layer 101 and the second alignment layer 201.

The liquid crystal molecules of the first domain to the fourth domain D1, D2, D3, and D4 described in the present exemplary embodiment may be arranged as shown in FIG. 4A and FIG. 4B.

Figure 12:
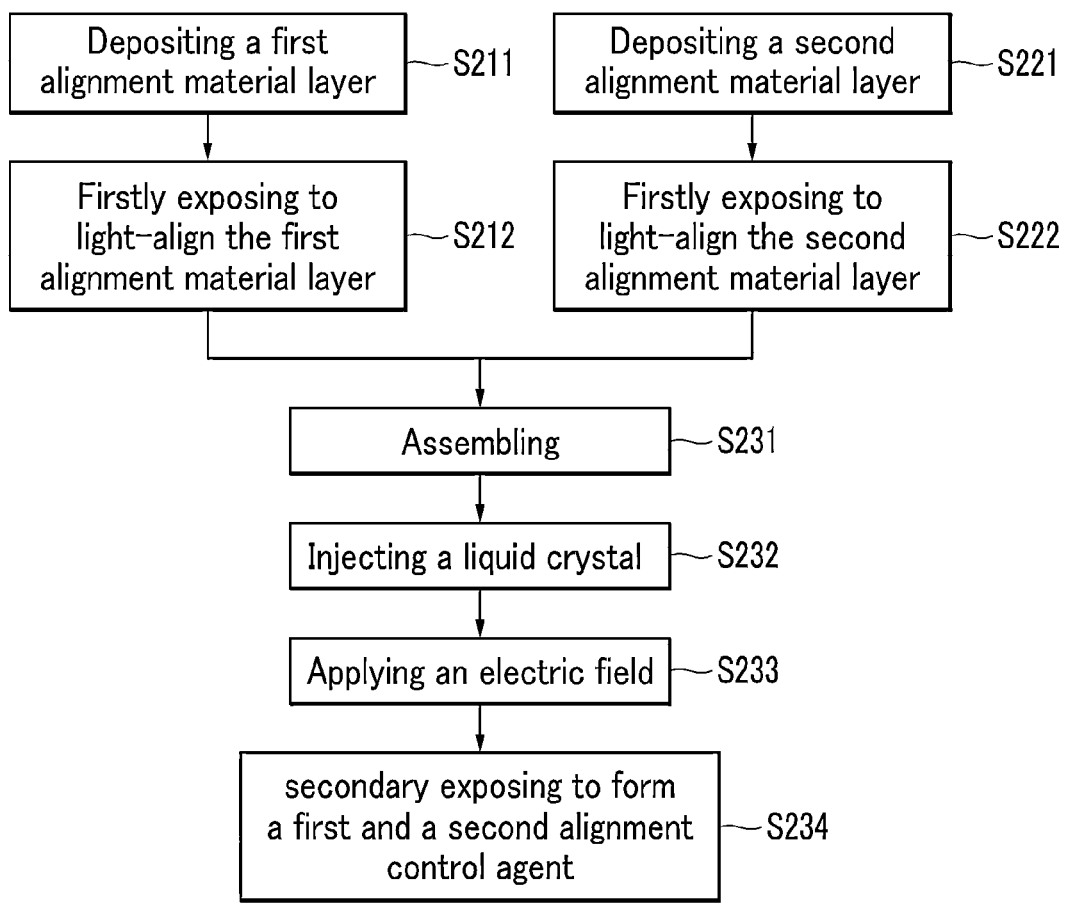
FIG. 12 is a flowchart showing a manufacturing method of a liquid crystal display according to another exemplary embodiment of the present invention.
Figure 13:
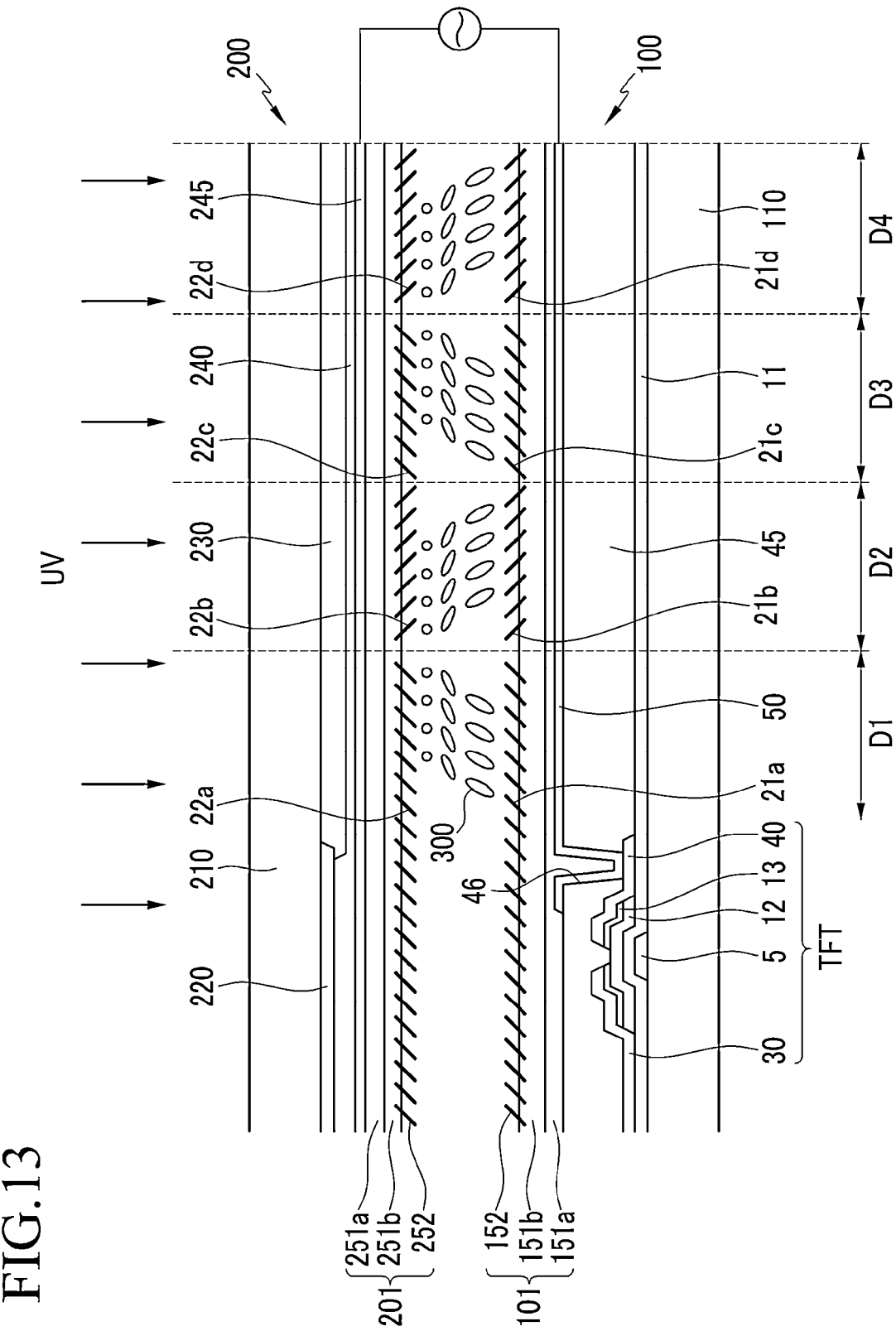
FIG. 13 is a cross-sectional view showing a portion of a manufacturing method of a liquid crystal display according to another exemplary embodiment of the present invention.

Next, a manufacturing method of a liquid crystal display according to another exemplary embodiment of the present invention will be described with reference to FIG. 12 and FIG. 13 as well as FIG. 6 to FIG. 10. FIG. 12 is a flowchart showing a manufacturing method of a liquid crystal display according to the present exemplary embodiment, and FIG. 13 is a cross-sectional view showing a portion of a manufacturing method of a liquid crystal display according to the present exemplary embodiment.

Referring to FIG. 12, the first alignment material layer including the first alignment base layer 151a, the second alignment base layer 151b, and the alignment control material of the photo-polymerizable monomer or oligomer is deposited on the first substrate 1 (S211). Here, as described above, the first alignment base layer 151a includes the horizontal alignment material and the second alignment base layer 151b includes the vertical alignment material. In detail, the horizontal alignment material layer is deposited, and the vertical alignment material layer of which the vertical alignment material and the alignment control material of the photo-polymerizable monomer or oligomer are mixed is deposited thereon. Here, after depositing the horizontal alignment material layer, the vertical alignment material layer may be deposited after light-aligning to form the pre-tilt.

Next, the first alignment material layer including the first alignment base layer 151a and the second alignment base layer 151b is primarily exposed to light-align the first alignment material layer (S212). The method for exposing the first alignment material layer for the light-alignment is similar to the description with reference to FIG. 9A to FIG. 9C and FIG. 10.

Also, the second alignment material layer including the third alignment base layer 251a and the fourth alignment base layer 251b is deposited on the second substrate 210 (S221), and is primarily exposed for light-aligning the second alignment material layer (S222). As described above, the third alignment base layer 251a includes the horizontal alignment material and the fourth alignment base layer 251b includes the vertical alignment material. In detail, the horizontal alignment material layer is deposited, and the vertical alignment material layer of which the vertical alignment material and the alignment control material of the photo-polymerizable monomer or oligomer are mixed is deposited thereon. Here, after depositing the horizontal alignment material layer, the vertical alignment material layer may be deposited after light-aligning to form the pre-tilt. The method for exposing the second alignment material layer for the light-alignment is similar to the description with reference to FIG. 9A to FIG. 9C and FIG. 10.

Next, the lower display panel 100 and the upper display panel 200 are combined (S231), and the liquid crystal layer 300 is injected (S232). The introduction of the liquid crystal may be performed by a method in which the liquid crystal is injected between the two substrates having the alignment layer including the photo-polymerizable monomer or oligomer. The liquid crystal molecules of the injected liquid crystal layer 300 are arranged according to the light-alignment characteristics of the first alignment layer 101 and the second alignment layer 201. Here, the photo-polymerizable monomer or oligomer may be added to the liquid crystal, and the liquid crystal may be injected.

Next, as shown in FIG. 13, the predetermined voltage is applied to the pixel electrode 50 of the lower display panel 100 and the common electrode 245 of the upper display panel 200 (S233), the liquid crystal molecules of the liquid crystal layer 300 are aligned to have the different pre-tilt for each domain, and the lower display panel 100 and the upper display panel 200 are secondarily exposed to polymerize the alignment control material such as the photo-polymerizable monomer or oligomer are included in the first alignment material layer and the second alignment material layer and to fix the plurality of branches 21a, 21b, 21c, 21d, 22a, 22b, 22c, and 22d, and thereby the first alignment control agent 152 and the second alignment control agent 252 are formed (S234) and the first alignment layer 101 and the second alignment layer 201 are completed. The change of the alignment of the liquid crystal according to the application of the electric field is performed according to the dielectric anisotropy of the liquid crystal, and in the case of liquid crystal having positive dielectric anisotropy, it is sloped in a direction that is parallel to the electric field, and in the case of liquid crystal having negative dielectric anisotropy, it is sloped in a direction that is perpendicular to the electric field. In addition, the degree of change of the alignment of the liquid crystal may vary according to the intensity of the electric field.

In this way, after injecting the liquid crystal layer 300, if the first alignment control agent 152 and the second alignment control agent 252 are formed, a plurality of branches 21a, 21b, 21c, 21d, 22a, 22b, 22c, and 22d extended from the alignment base layers 151a, 151b, 251a, and 251b and the alignment control material may be arranged in the arrangement direction of the liquid crystal layer 300, and are polymerized in the arrangement direction of the liquid crystal layer 300 such that even after the applied first electric field is eliminated, the arrangement is maintained and affects the alignment of the neighboring liquid crystal. Accordingly, the pre-tilt direction in which the liquid crystal molecules of the liquid crystal layer 300 are arranged may be further reinforced.

Also, if the predetermined voltage is applied to the pixel electrode 50 and the common electrode 245, by the dielectric anisotropy of the alignment control material such as the photo-polymerizable monomer or oligomer included in the first alignment material layer and the second alignment material layer, the plurality of branches 21a, 21b, 21c, 21d, 22a, 22b, 22c, and 22d protruded from the alignment base layers 151b and 251b and the alignment control material are reacted by the electric field, and may be arranged according to the arrangement of the liquid crystal layer 300 and accordingly the pre-tilt direction may be further reinforced.

Figure 14:
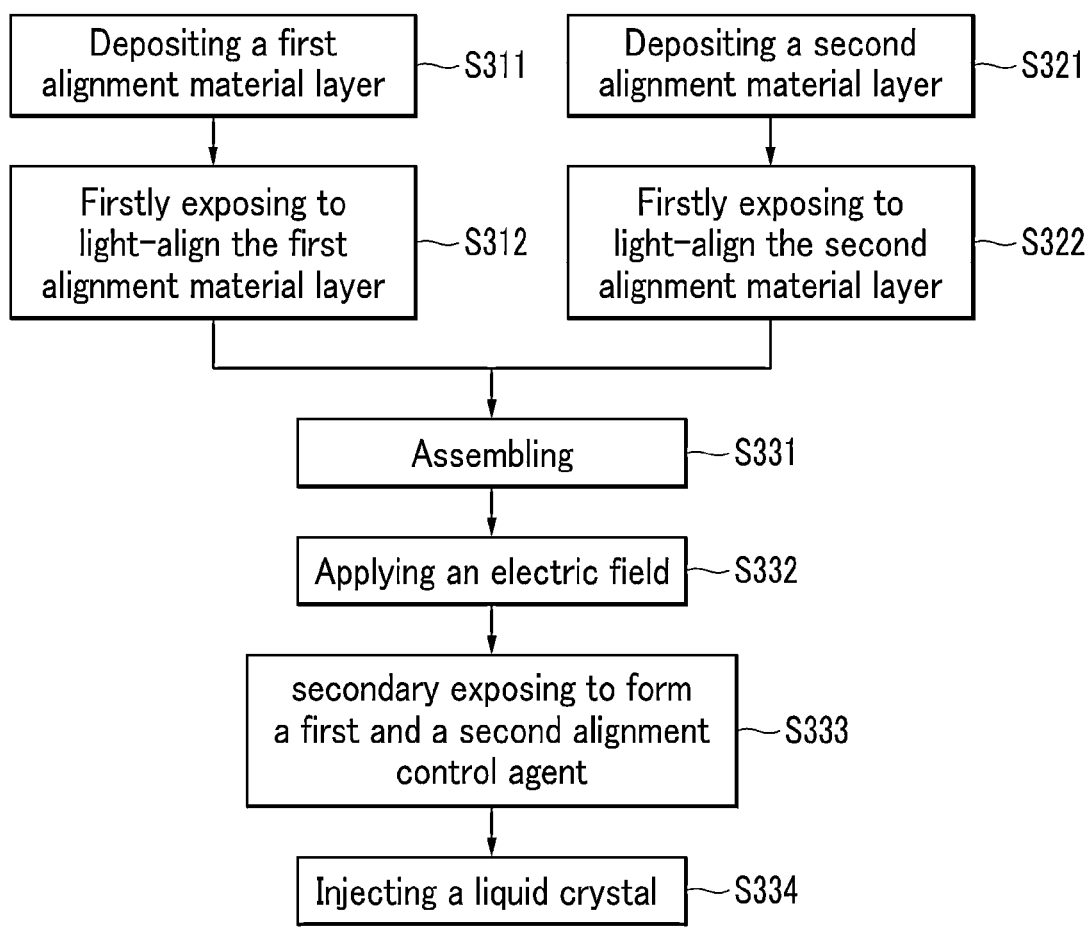
FIG. 14 is a flowchart explaining a manufacturing method of a liquid crystal display according to another exemplary embodiment of the present invention.

Next, a manufacturing method of a liquid crystal display according to another exemplary embodiment of the present invention with reference to FIG. 14. FIG. 14 is a flowchart for explaining a manufacturing method of a liquid crystal display according to another exemplary embodiment of the present invention.

The manufacturing method of the liquid crystal display according to the present exemplary embodiment is similar to the manufacturing method of the liquid crystal display according to the exemplary embodiment described with reference to FIG. 12 and FIG. 13.

However, differently from the manufacturing method of the liquid crystal display according to the exemplary embodiment described with reference to FIG. 12 and FIG. 13, in the manufacturing method of the liquid crystal display according to the present exemplary embodiment, after depositing the first alignment material layer including the first alignment base layer 151a and the second alignment base layer 151b (S311) and it is light-aligned (S312), the second alignment material layer including the third alignment base layer 251a and the fourth alignment base layer 251b is deposited (S321) and light-aligned (S322), the two display panels 100 and 200 are combined (S331), the secondary exposure is performed in the state in which the two electrodes 50 and 240 of the two display panels 100 and 200 are applied with the electric field (S332), and the liquid crystal layer is injected (S334) after completing the first alignment control agent 152 and the second alignment control agent 252(S333). The introduction of the liquid crystal is performed by using a vacuum injection or a dripping method. The liquid crystal layer may be aligned by the alignment characteristics of the alignment layer.

If the predetermined voltage is applied to the pixel electrode 50 and the common electrode 245, by the dielectric anisotropy of the alignment control material such as the photo-polymerizable monomer or oligomer included in the first alignment material layer and the second alignment material layer, the plurality of branches 21a, 21b, 21c, 21d, 22a, 22b, 22c, and 22d protruded from the alignment base layers 151b and 251b and the alignment control material may be reacted by the electric field and may be arranged, and in this way the polymerization is performed in the arranged direction through the reaction of the electric field such that the arrangement is maintained and affects the alignment of the neighboring liquid crystal after removing the electric field.

Accordingly, the pre-tilt direction in which the liquid crystal molecules of the liquid crystal layer 300 are arranged may be reinforced.

In the manufacturing method of the liquid crystal display according to the previous described exemplary embodiments, the alignment base layer is primarily exposed for the light-alignment and is secondarily exposed to form the alignment control agent, however in the manufacturing method of the liquid crystal display according to another exemplary embodiment of the present invention, the alignment base layer may be light-aligned and simultaneously the alignment control agent may be polymerized to form the alignment control agent through one exposure. In detail, after forming the alignment material layer including the alignment base material and the photo-polymerizable monomer and oligomer, the alignment base layer is primarily exposed for the light-alignment and the alignment control agent is simultaneously formed. Here, after the upper display panel and the lower display panel are exposed once thereby forming the first alignment base layer and the first alignment control agent, and the second alignment base layer and the second alignment control agent, the liquid crystal display may be formed by combining the lower display panel and the upper display panel. Also, after combining the upper display panel and the lower display panel on which the alignment material layers are formed and are exposed, the first alignment base layer and the first alignment control agent, and the second alignment base layer and the second alignment control agent, may be formed. In this case, the exposure may be executed before injecting the liquid crystal layer or after injecting the liquid crystal layer.

Figure 15:
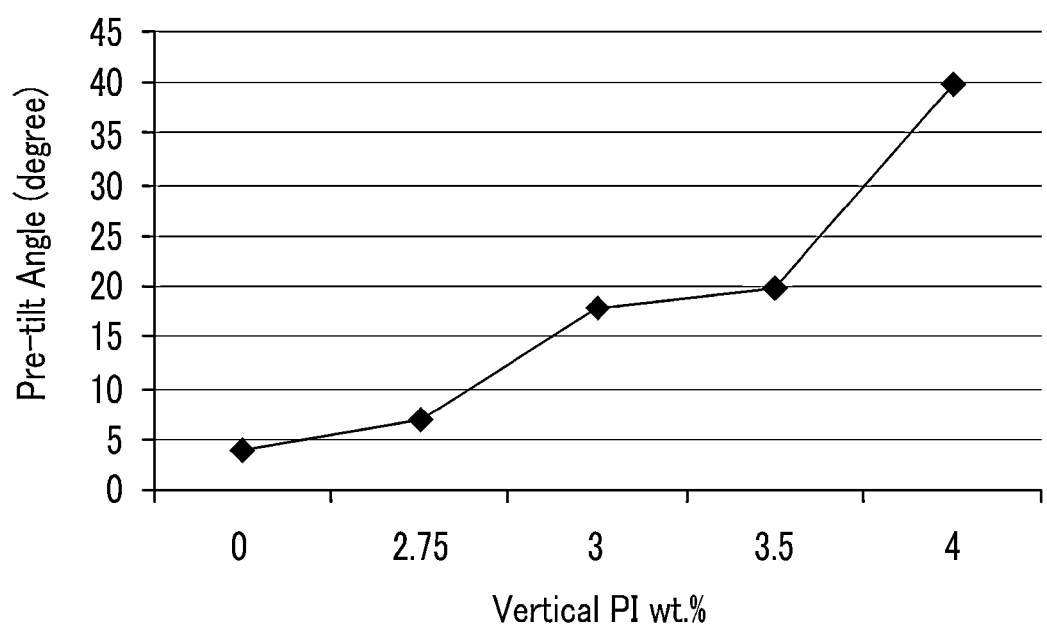
FIG. 15 is a graph showing a result of a pre-tilt of double alignment layers of a liquid crystal display according to an experimental example of the present invention.

Next, a pre-tilt result of double alignment layers of a liquid crystal display according to an experimental example of the present invention will be described with reference to FIG. 15. FIG. 15 is a graph showing a result of a pre-tilt of double alignment layers of a liquid crystal display according to an experimental example of the present invention.

Referring to FIG. 15, in the alignment layer including the horizontal alignment layer and the vertical alignment layer according to an exemplary embodiment of the present invention, the polar angle of the pre-tilt is increased as the amount (wt %) of the vertical alignment layer is increased. Accordingly, in the case of using the alignment layer including the horizontal alignment layer and the vertical alignment layer according to an exemplary embodiment of the present invention, by controlling the amount of the vertical alignment layer, the liquid crystal molecules may be aligned to have the desired polar angle of the pre-tilt.

Figure 16:
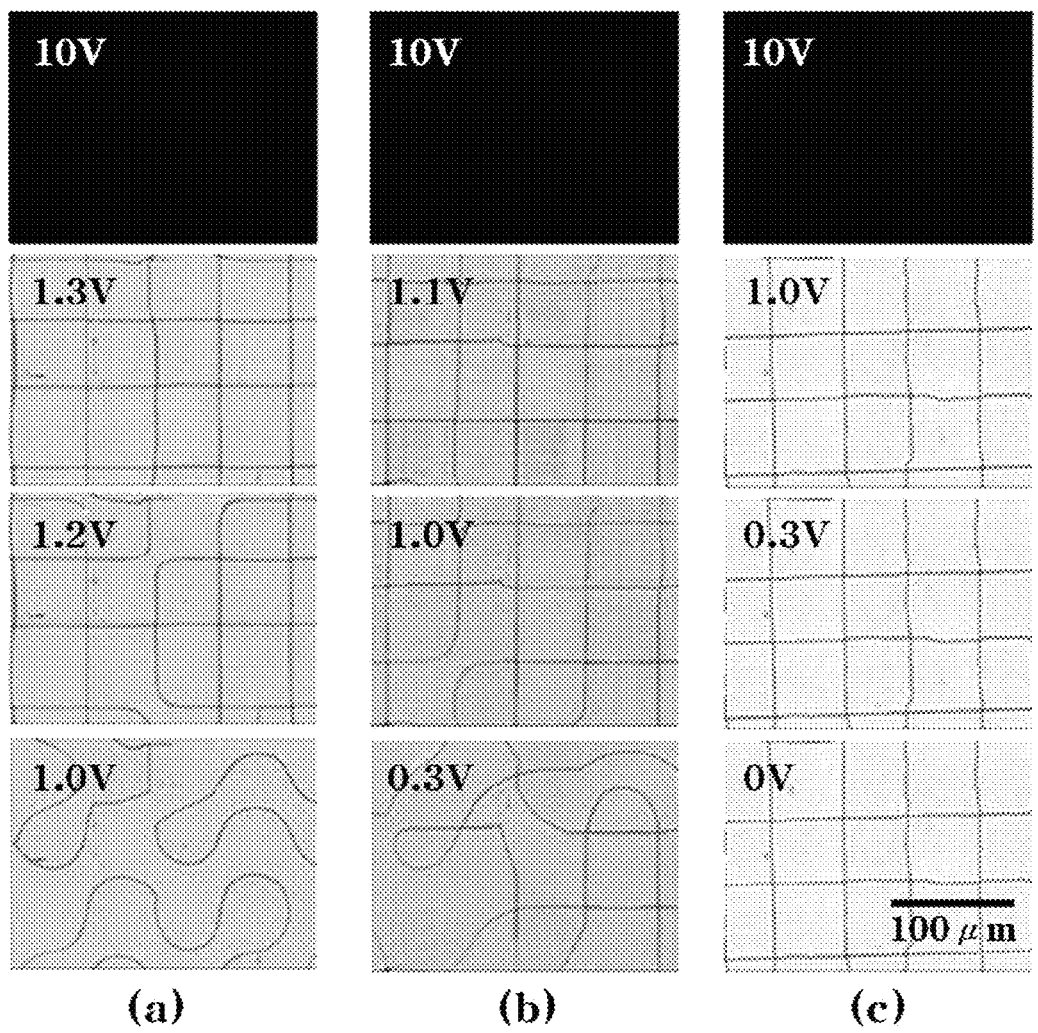
FIG. 16 is a graph showing an estimation result of domain stability of a liquid crystal display according to an experimental example of the present invention.

Next, domain stability of a liquid crystal display according to an experimental example of the present invention will be described with reference to FIG. 16. FIG. 16 is a graph showing an estimating result of domain stability of a liquid crystal display according to an experimental example of the present invention. A solid line shown in each view in FIG. 16 indicates a domain boundary. FIG. 16 (a) shows the case in which the polar angle of the pre-tilt is 4°, FIG. 16 (b) shows the case in which the polar angle of the pre-tilt is 7°, and FIG. 16 (c) shows the case in which the polar angle of the pre-tilt is 18°.

Referring to FIG. 16 (a), when the liquid crystal molecules aligned by the alignment layer have the polar angle of the pre-tilt of 4°, it may be confirmed that the stability of the four domains is deteriorated in the low gray range when the liquid crystal layer is applied with the voltage of about 1.2V, and referring to FIG. 16 (b), when the liquid crystal molecules have the polar angle of the pre-tilt of 7°, it may be confirmed that the stability of the four domains is deteriorated in the low gray range when the liquid crystal layer is applied with the voltage of about 1.0V. Referring to FIG. 16 (c), when the liquid crystal molecules aligned by the alignment layer have the polar angle of the pre-tilt of 18°, it may be confirmed that the four multi-domains are stable at the low voltage of 0V. That is, when the polar angle of the pre-tilt is less than 18°, the multi-domains are not formed at the low voltage. Accordingly, in the display panel for a liquid crystal display according to the present exemplary embodiment, the polar angle of the pre-tilt is controlled by using the alignment layer including the horizontal alignment layer and the vertical alignment layer such that the stable multi-domain may be realized.

Figure 17A:
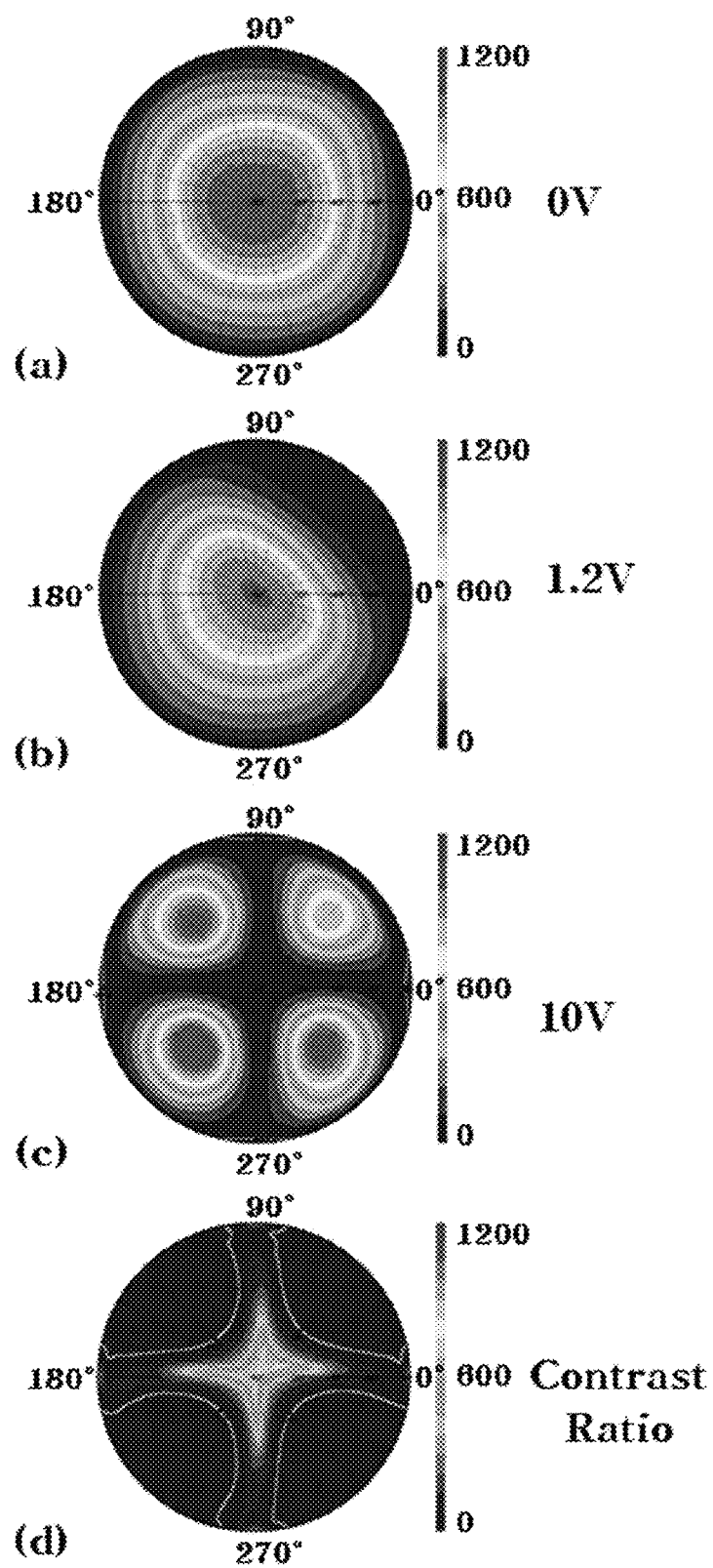
FIG. 17A and FIG. 17B are graphs showing an estimation result of display characteristics of a multi-domain of a liquid crystal display according to an experimental example of the present invention.
Figure 17B:
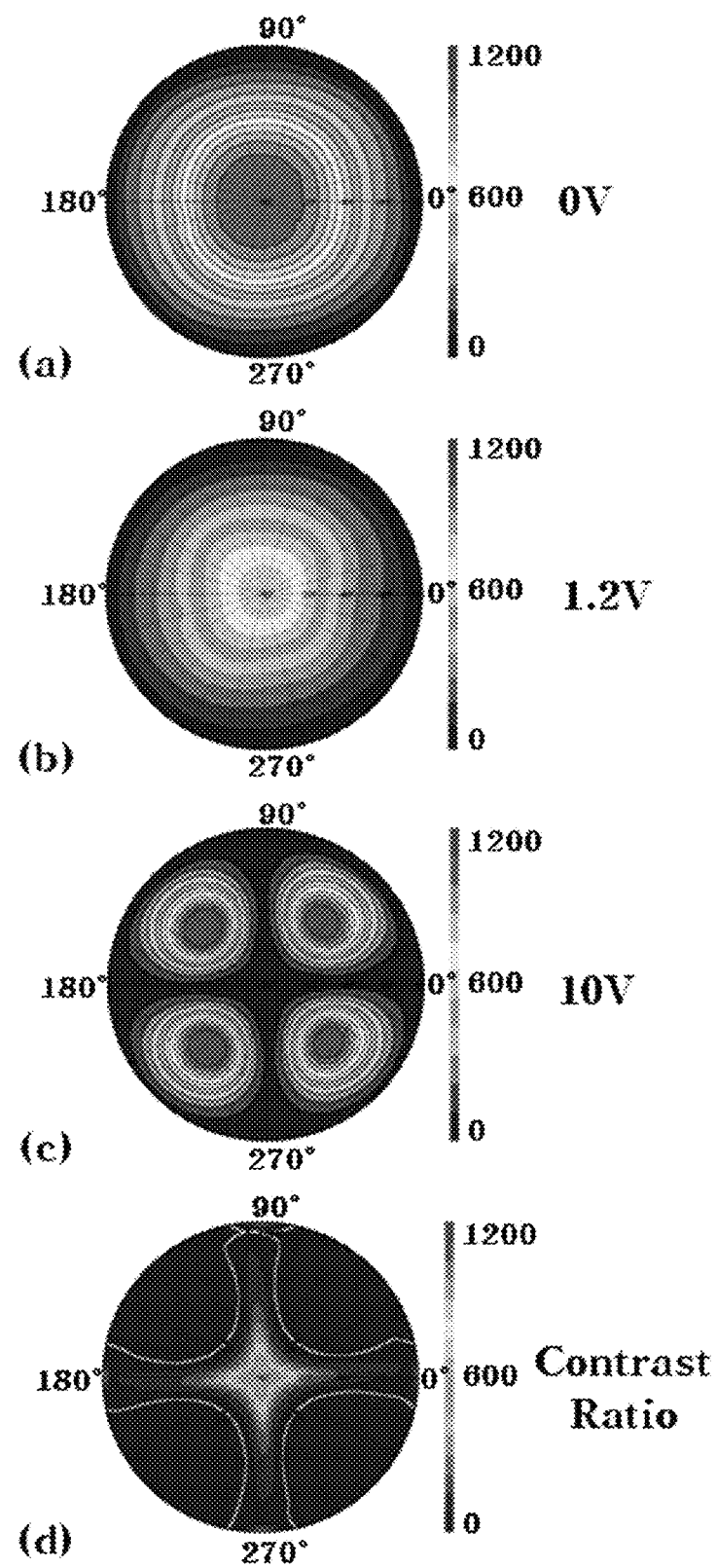

Next, display characteristics of a multi-domain of a liquid crystal display according to an experimental example of the present invention will be described with reference to FIG. 17A and FIG. 17B. FIG. 17A and FIG. 17B are graphs showing estimation results of display characteristics of a multi-domain of a liquid crystal display according to an experimental example of the present invention.

FIG. 17A shows the case in which the conventional horizontal alignment layer is used to form four domains in the liquid crystal display of the twisted nematic mode, and FIG. 17B shows the case of forming four domains in the liquid crystal display of the twisted nematic mode having the alignment base layer including the horizontal alignment layer and the vertical alignment layer, and the alignment control agent according to the exemplary embodiment of the present invention.

FIG. 17A and FIG. 17B (a), (b), and (c) show the luminance distribution of the cases in which the voltages applied to the liquid crystal layer are respectively 0V, 1.2V, and 10V, and (d) shows a contrast ratio distribution.

Referring to FIG. 17A and FIG. 17B, in the case of forming four domains in the liquid crystal display of the twisted nematic mode having the alignment base layer including the horizontal alignment layer and the vertical alignment layer, and the alignment control agent according to the exemplary embodiment of the present invention, compared with the case of forming four domains by using the conventional horizontal alignment layer in the liquid crystal display of the twisted nematic mode, it may be confirmed that four domains are symmetrical in the luminance distribution and the contrast ratio distribution. Accordingly, in the case of the liquid crystal display according to an exemplary embodiment of the present invention, the twisted nematic liquid crystal display having four domains with the direction symmetry in the whole gray range may be realized. Accordingly, a liquid crystal display having an excellent viewing angle in the whole gray range may be realized.

Figure 18A:
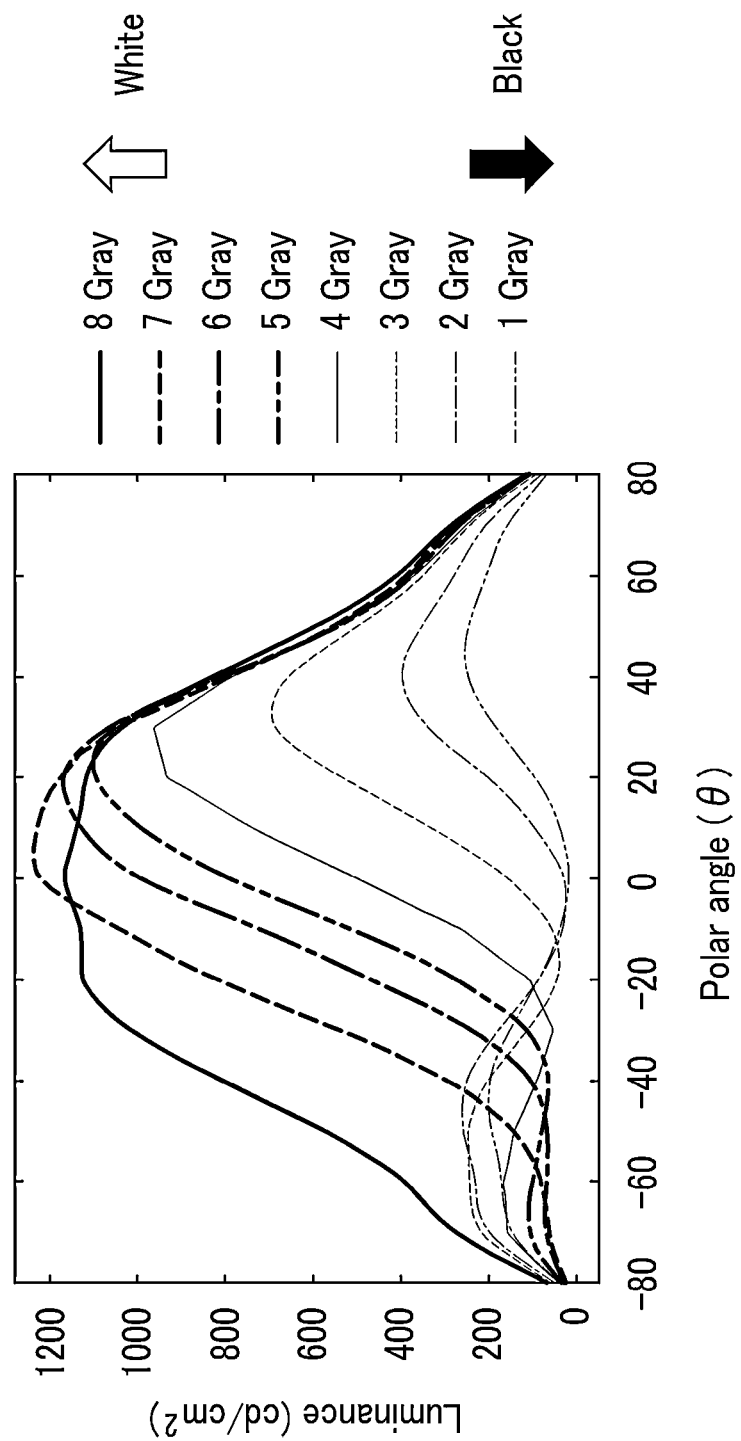
FIG. 18A and FIG. 18B are graphs showing transmittance results per gray according to positions of a liquid crystal display according to an experimental example of the present invention.
Figure 18B:
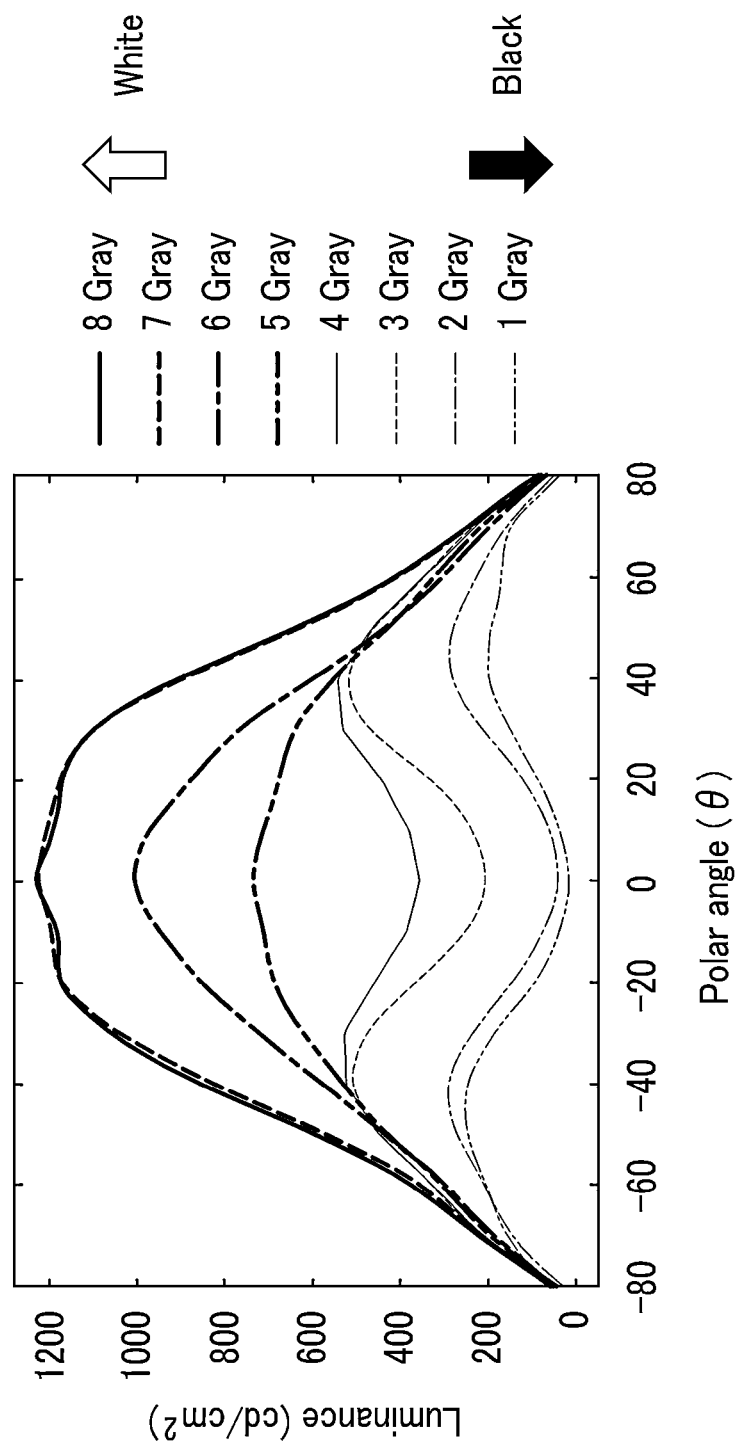

Next, display characteristics of a liquid crystal display according to an experimental example of the present invention will be described with reference to FIG. 18A and FIG. 18B. FIG. 18A and FIG. 18B are graphs showing a transmittance result per gray according to positions of a liquid crystal display according to an experimental example of the present invention.

FIG. 18A shows the case using the conventional horizontal alignment layer, and FIG. 18B shows the case including the alignment control agent for the alignment layer including the horizontal alignment layer and the vertical alignment layer according to the exemplary embodiment of the present invention.

Referring to FIG. 18A, in the case of using the conventional horizontal alignment layer, the transmittance change according to the gray correctly appears in the range of less than about −50° of the polar angle according to the positions of the liquid crystal display, however gray scale inversion in which the transmittance according to the gray reversely appears in the range of more than the polar angle is generated. Referring to FIG. 18B, for the case including the alignment control agent for the alignment layer including the horizontal alignment layer and the vertical alignment layer according to the exemplary embodiment of the present invention, in the whole range of the polar angle, transmittance change according to the gray correctly appears without the gray scale inversion.

In this way, compared with the liquid crystal display of the general twisted nematic mode, in the case of the liquid crystal display according to an exemplary embodiment of the present invention, it may be confirmed that the viewing angle symmetry is improved and the gray scale inversion is improved.

Figure 19A:
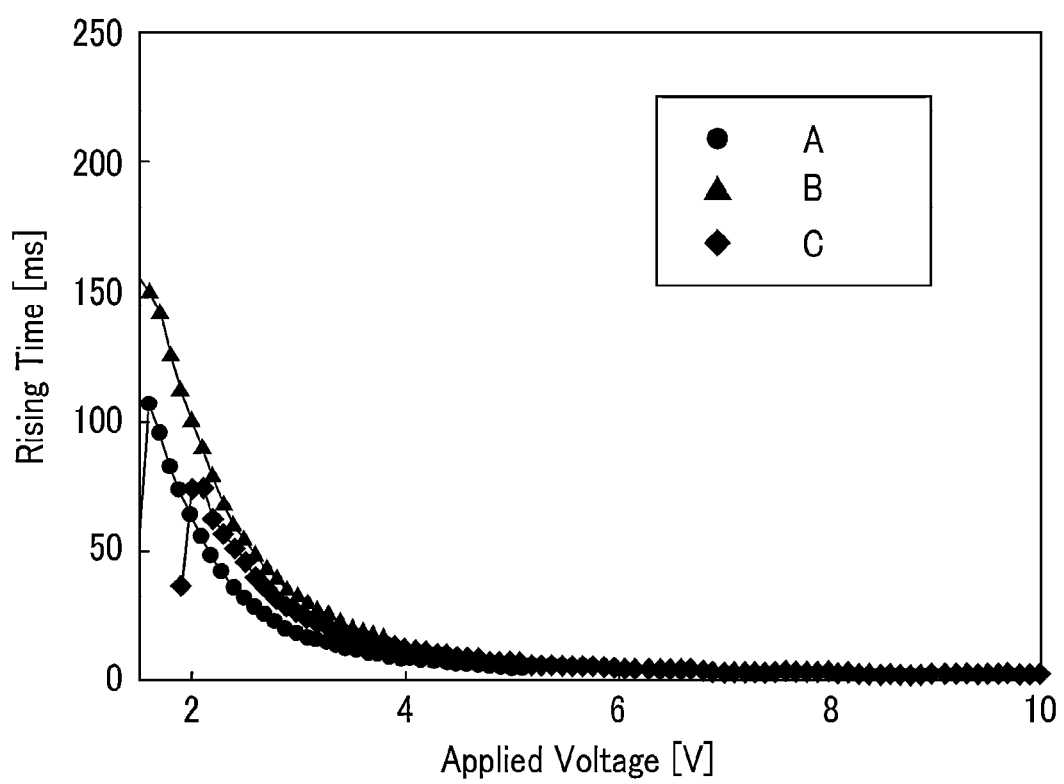
FIG. 19A to FIG. 19C are graphs showing response speed results of a liquid crystal display according to an experimental example of the present invention.
Figure 19B:
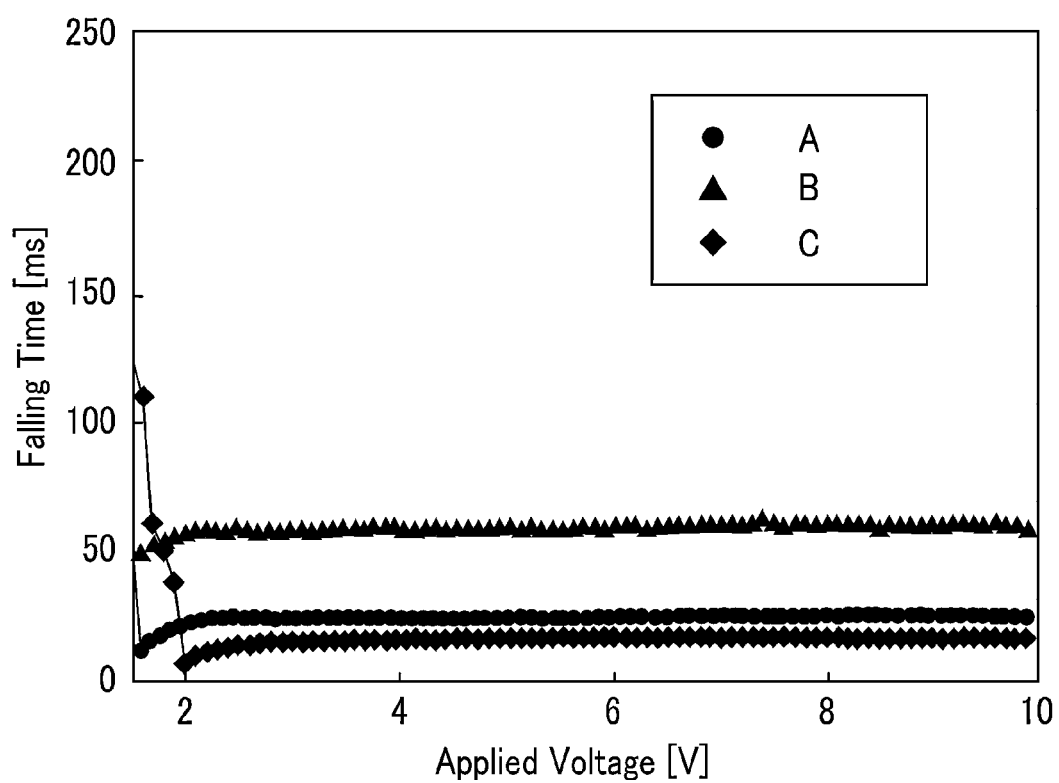
Figure 19C:
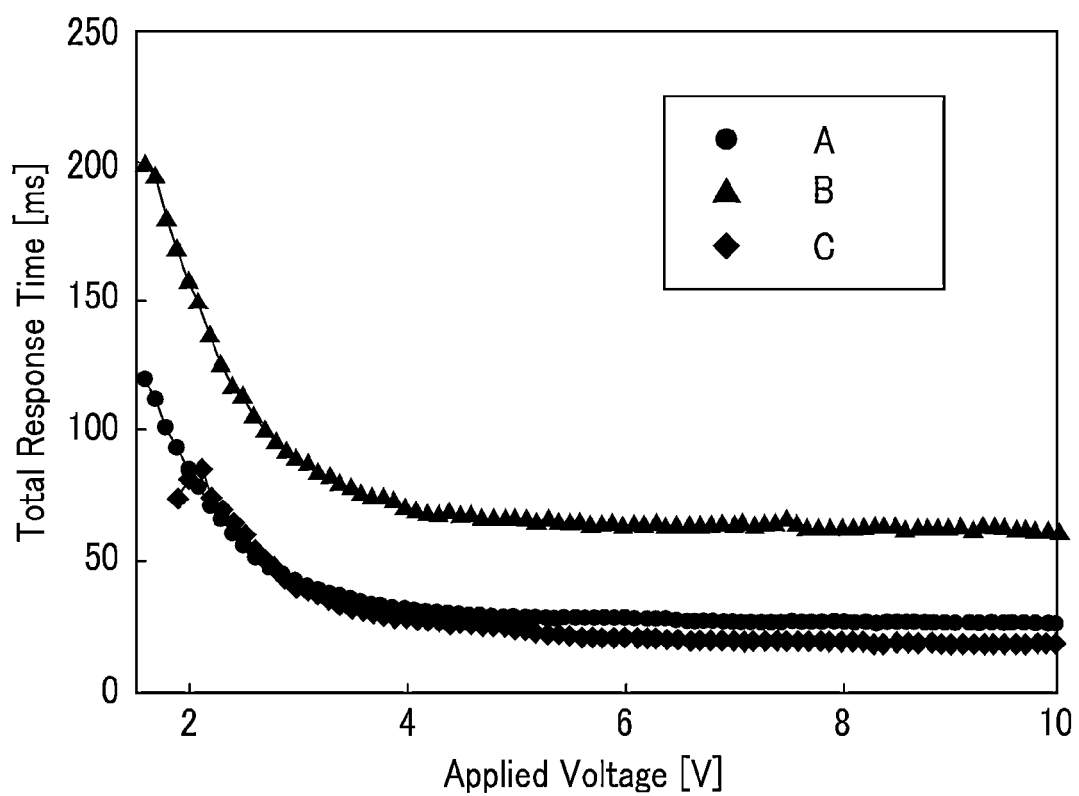

Next, a response speed result of a liquid crystal display according to an experimental example of the present invention will be described with reference to FIG. 19A to FIG. 19C. FIG. 19A to FIG. 19C are graphs showing response speed results of a liquid crystal display according to an experimental example of the present invention. FIG. 19A shows a rising time of the liquid crystal molecules, FIG. 19B shows a falling time of the liquid crystal molecules, and FIG. 19C shows a total response time of the liquid crystal molecules. In FIG. 19A to FIG. 19C, A is related to the liquid crystal display of the general twisted nematic mode, B is related to the liquid crystal display of the general multi-domain twisted nematic mode, and C is related to the multi-domain liquid crystal display according to an exemplary embodiment of the present invention.

Referring to FIG. 19A to FIG. 19C, compared with the liquid crystal displays of the general twisted nematic mode or the general multi-domain twisted nematic mode, in the case of the multi-domain liquid crystal display according to an exemplary embodiment of the present invention, the response speed is improved. In this way, in the liquid crystal display according to an exemplary embodiment of the present invention, the alignment control agent is included in the double alignment layers such that the response speed may be improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

| <Description of symbols> | |
|---|---|
| 100: lower display panel | 101a: first alignment layer |
| 101b: third alignment layer | 101c: fifth alignment layer |
| 110: first substrate | 120: first alignment base layer |
| 130: second alignment base layer | 140a: first alignment control agent |
| 140b: third alignment control agent | 140c: fifth alignment control agent |
| 150: fifth alignment base layer | 160: seventh alignment base layer |
| 200: upper display panel | 201a: second alignment layer |
| 201b: fourth alignment layer | 201c: sixth alignment layer |
| 210: second substrate | 220: third alignment base layer |
| 230: fourth alignment base layer | 240a: second alignment control agent |
| 240b: fourth alignment control agent | 240c: sixth alignment control agent |
| 250: sixth alignment base layer | 260: eighth alignment base layer |
| 3: liquid crystal layer | 31: liquid crystal molecules |

What is claimed is:

1. A liquid crystal display comprising:
a first substrate; and
a first alignment layer including
a first horizontal alignment base layer disposed on the first substrate,
a first vertical alignment base layer disposed on the first horizontal alignment layer, and
a first alignment control agent extended from inside of the first vertical alignment base layer,
wherein the first alignment layer is light-aligned.

2. The liquid crystal display of claim 1, wherein the first alignment control agent is formed by polymerizing a photo-polymerizable monomer or oligomer.

3. The liquid crystal display of claim 2, wherein the photo-polymerizable monomer or oligomer includes a reactive mesogen.

4. The liquid crystal display of claim 1, wherein the first alignment layer includes a first region and a second region that are light-aligned in different directions.

5. The liquid crystal display of claim 4, wherein the first region and the second region are light-aligned in opposite directions.

6. The liquid crystal display of claim 1, further comprising:
a second substrate facing the first substrate;
a second alignment layer including
a second horizontal alignment base layer disposed on the second substrate,
a second vertical alignment base layer disposed on the second horizontal alignment base layer, and
a second alignment control agent extended from the second vertical alignment base layer; and
a liquid crystal layer interposed between the first substrate and the second substrate.

7. The liquid crystal display of claim 6, wherein the first alignment control agent and the second alignment control agent are formed by polymerizing a photo-polymerizable monomer or oligomer.

8. The liquid crystal display of claim 7, wherein the photo-polymerizable monomer or oligomer includes a reactive mesogen.

9. The liquid crystal display of claim 6, wherein the liquid crystal layer is a twisted nematic liquid crystal layer.

10. The liquid crystal display of claim 6, wherein the first alignment layer includes a first region and a second region that are light-aligned in opposite directions, and the second alignment layer includes a third region and a fourth region that are light-aligned in opposite directions.

11. The liquid crystal display of claim 10, wherein the light-alignment directions of the first region and the second region are perpendicular to the light-alignment directions of the third region and the fourth region.

12. The liquid crystal display of claim 6, wherein the second alignment layer is light-aligned.

13. A liquid crystal display comprising:
a first substrate; and
a first alignment layer disposed on the first substrate and including
a first alignment base layer disposed on the first substrate and formed by mixing a horizontal alignment material and a vertical alignment material and
a first alignment control agent extended from inside of the alignment base layer,
wherein the first alignment base layer is light-aligned and the first alignment control agent is formed by polymerizing a photo-polymerizable monomer or oligomer including a reactive mesogen.

14. The liquid crystal display of claim 13, wherein the first alignment layer includes a first region and a second region that are light-aligned in different directions.

15. The liquid crystal display of claim 14, wherein
the first region and the second region are light-aligned in opposite directions.

16. The liquid crystal display of claim 13, further comprising:
a second substrate facing the first substrate; and
a second alignment layer disposed on the second substrate and including
a second alignment base layer disposed on the second substrate and
including a horizontal alignment material and a vertical alignment material and
a second alignment control agent extended from the second alignment base layer; and
a liquid crystal layer interposed between the first substrate and the second substrate.

17. The liquid crystal display of claim 16, wherein
the first alignment control agent and the second alignment control agent are formed by polymerizing a photo-polymerizable monomer or oligomer.

18. The liquid crystal display of claim 17, wherein
the photo-polymerizable monomer or oligomer is a reactive mesogen.

19. The liquid crystal display of claim 16, wherein
the liquid crystal layer is a twisted nematic liquid crystal layer.

20. The liquid crystal display of claim 16, wherein
the first alignment layer includes a first region and a second region that are light-aligned in opposite directions, and
the second alignment layer includes a third region and a fourth region that are light-aligned in opposite directions.

21. The liquid crystal display of claim 20, wherein
the light-alignment directions of the first region and the second region are perpendicular to the light-alignment directions of the third region and the fourth region.

22. A method for manufacturing a liquid crystal display, comprising:
depositing a first alignment material layer including a horizontal alignment material, a vertical alignment material, and an alignment control material on a first substrate;
primarily exposing the first alignment material layer to a light to form a first alignment base layer having a plurality of domains; and
secondarily exposing the first alignment material layer to a light to form a first alignment control agent by polymerizing the alignment control material,
wherein the first alignment control agent includes a plurality of branches extended from the first alignment base layer.

23. The method of claim 22, further comprising:
depositing a second alignment material layer including a horizontal alignment material, a vertical alignment material, and an alignment control material on a second substrate;
primarily exposing the second alignment material layer to a light to form a second alignment base layer having a plurality of domains; and
secondarily exposing the second alignment material layer to a light to form a second alignment control agent by polymerizing the alignment control material,
wherein the second alignment control agent includes a plurality of branches extended from the second alignment base layer.

24. The method of claim 23, wherein:
assembling the first substrate including the first alignment base layer and the first alignment control agent, and the second substrate including the second alignment base layer and the second alignment control agent to face each other; and
injecting a liquid crystal layer between the first substrate and the second substrate.

25. The method of claim 23, wherein
the first alignment control agent and the second alignment control agent are formed by polymerizing a photo-polymerizable monomer or oligomer.

26. The method of claim 25, wherein
the photo-polymerizable monomer or oligomer includes a reactive mesogen.

27. The method of claim 24, wherein
the liquid crystal layer is a twisted nematic liquid crystal layer.

28. The method of claim 24, wherein
the first alignment base layer includes a first region and a second region that are light-aligned in opposite directions, and
the second alignment base layer includes a third region and a fourth region that are light-aligned in opposite directions.

29. The method of claim 28, wherein
the light-alignment directions of the first region and the second region are perpendicular to the light-alignment directions of the third region and the fourth region.

30. A method for manufacturing a liquid crystal display, comprising:
depositing a first alignment material layer including a horizontal alignment material, a vertical alignment material, and an alignment control material on a first substrate;
primarily exposing the first alignment material layer to a light to form a first alignment base layer having a plurality of domains;
depositing a second alignment material layer including a horizontal alignment material, a vertical alignment material, and an alignment control material on a second substrate;
primarily exposing the second alignment material layer to a light to form a second alignment base layer having a plurality of domains;
assembling the first substrate and the second substrate to faced each other; and
secondarily exposing the first alignment material layer and the second alignment material layer to a light in a state in which the liquid crystal layer is applied with an electric field to form a first alignment control agent disposed on the first alignment base layer and a second alignment control agent disposed on the second alignment base layer,
wherein the first alignment control agent includes a plurality of branches extended from the first alignment base layer, and
the second alignment control agent includes a plurality of branches extended from the second alignment base layer.

31. The method of claim 30, wherein
the first alignment control agent and the second alignment control agent are formed by polymerizing a photo-polymerizable monomer or oligomer.

32. The method of claim 31, wherein
the photo-polymerizable monomer or oligomer includes a reactive mesogen.

33. The method of claim 30, wherein,
after assembling the first substrate and the second substrate to face each other,
injecting a liquid crystal layer between the first substrate and the second substrate.

34. The method of claim 33, wherein
the liquid crystal layer is a twisted nematic liquid crystal layer.

35. The method of claim 30, further comprising
injecting a liquid crystal layer between the first substrate and the second substrate after forming the alignment control agent and the second alignment control agent.

36. The method of claim 35, wherein
the liquid crystal layer is a twisted liquid crystal layer.

37. The method of claim 30, wherein
the first alignment base layer includes a first region and a second region that are light-aligned in opposite directions, and
the second alignment base layer includes a third region and a fourth region that are light-aligned in opposite directions.

38. The method of claim 37, wherein
the light-alignment directions of the first region and the second region are perpendicular to the light-alignment directions of the third region and the fourth region.

* * * * *